(12) United States Patent (10) Patent No.: US 8,356,480 B1
Albreaux, III (45) Date of Patent: Jan. 22, 2013

(54) ENERGY RECOVERY DEVICE

(76) Inventor: Dauphin Robert Albreaux, III, Tempe, AZ (US)

(*) Notice: Subject to any disclaimer, the term of this patent is extended or adjusted under 35 U.S.C. 154(b) by 1088 days.

(21) Appl. No.: 12/231,868

(22) Filed: Sep. 8, 2008

(51) Int. Cl.
*F15B 7/02* (2006.01)
(52) U.S. Cl. ............................................ 60/579; 60/398
(58) Field of Classification Search ............... 60/579, 60/398
See application file for complete search history.

(56) References Cited

U.S. PATENT DOCUMENTS

| | | | | |
|---|---|---|---|---|
| 159,660 | A | * | 2/1875 | Faivre ........................ 417/229 |
| 3,028,727 | A | * | 4/1962 | Anston ......................... 60/398 |
| 4,309,150 | A | * | 1/1982 | Payne ........................... 60/579 |
| 5,042,253 | A | * | 8/1991 | Kataoka ......................... 91/4 R |

* cited by examiner

Primary Examiner — F. Daniel Lopez

(57) ABSTRACT

A cluster of thrust rods are disposed in a module oriented to extend somewhat beyond the surface of a road or trackway adapted to receive vehicular traffic thereon, the thrust rod fastened to reciprocate in the presence of vehicular traffic and spring biased to return the thrust rod to an original, unstressed position. Each deflection of an associated thrust rod causes a fluid contained within a hydraulic piston/cylinder to be pulsed in response to pressure formed from a piston associated with the thrust rod, the thrust rod operating against spring tensioning to return to its unstressed state. Each fluid pulse is allowed to communicate through a single fluidic line to a second piston/cylinder arrangement having reduced cross section for a pulse of greater intensity and deflection, and spring biased to return to an original, unstressed position simultaneously with the thrust rod. This piston cylinder arrangement is provided with double sided piston surfaces one surface remote from the single fluidic line fluid. The remote surface deflection communicates with a pump/manifold system communicating with a reservoir executing its fluid to travel in a fluid conduit past a turbine and generator arrangement or a similar instrumentality for the useful output associated with a liquid impinging against the turbine's blades. Tailwater from the turbine flows to a reservoir to be reinitialized.

7 Claims, 36 Drawing Sheets

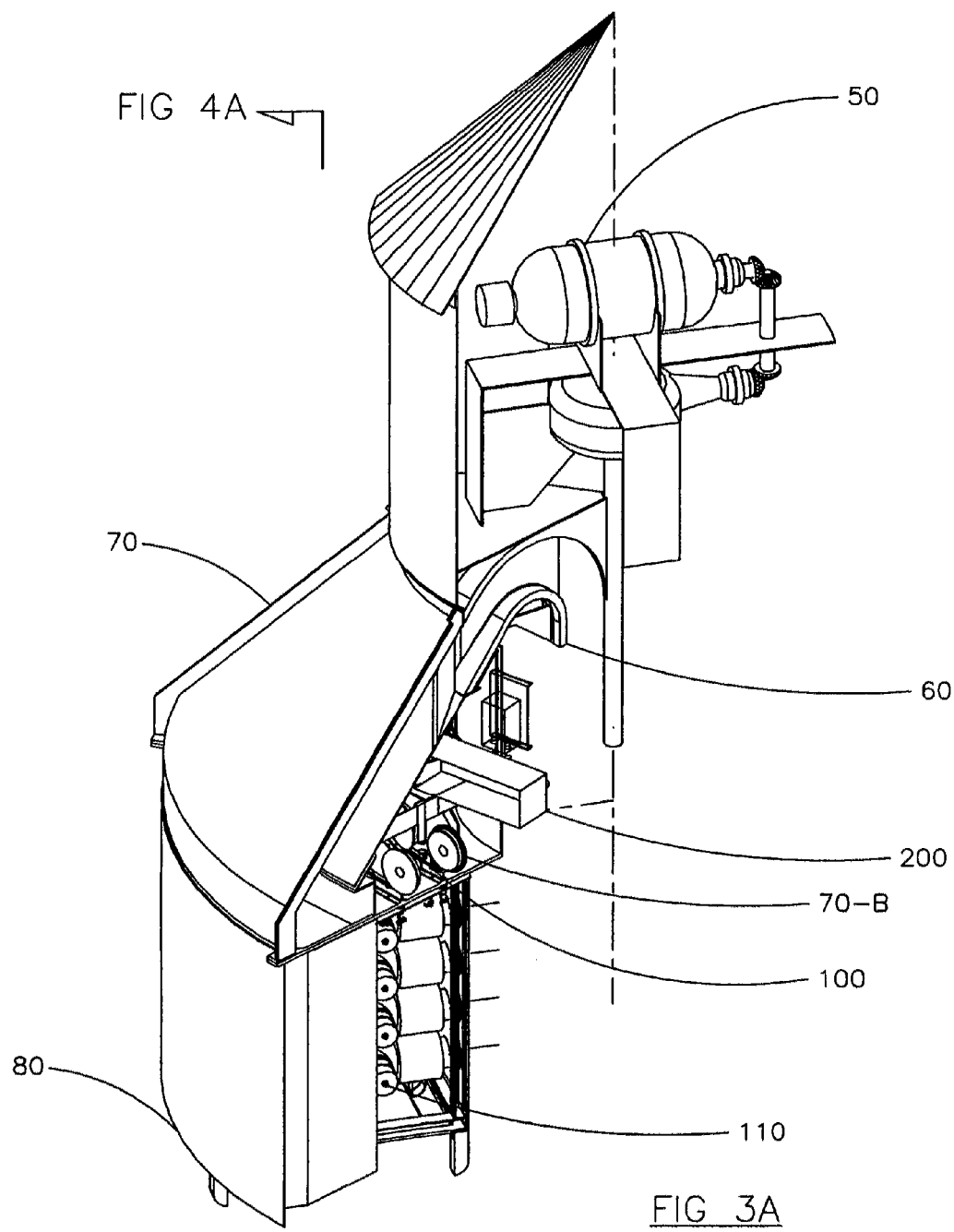

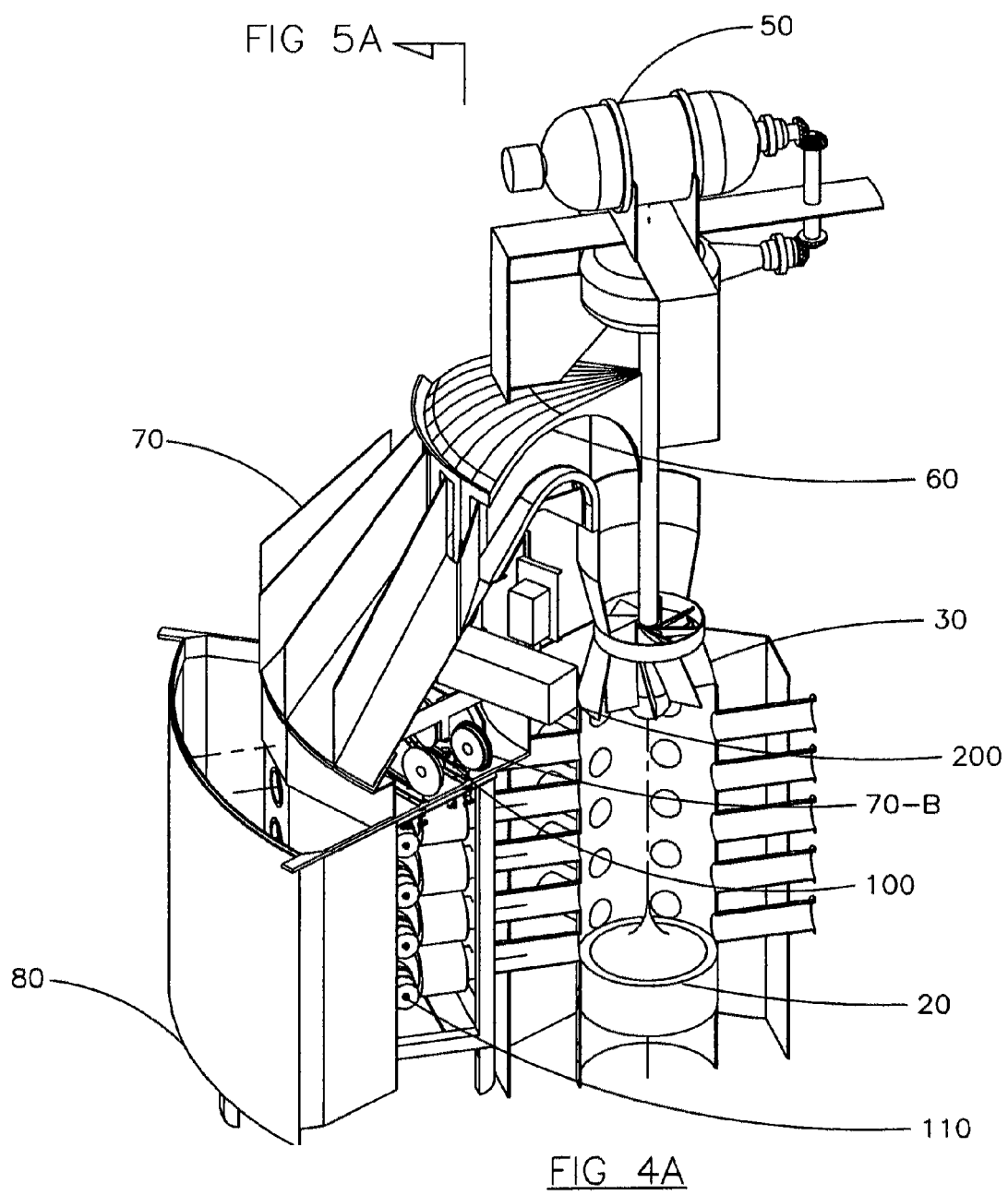

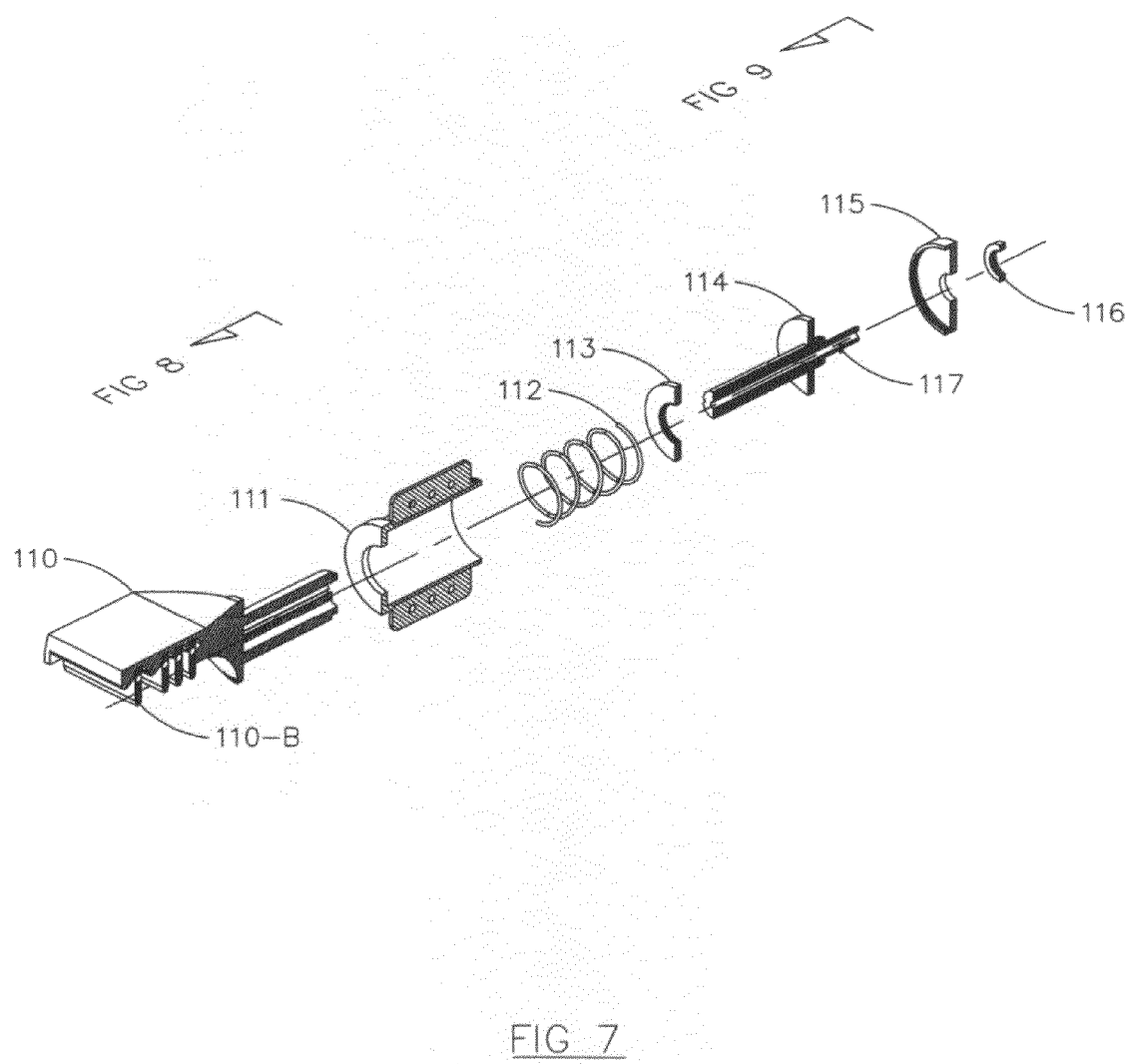

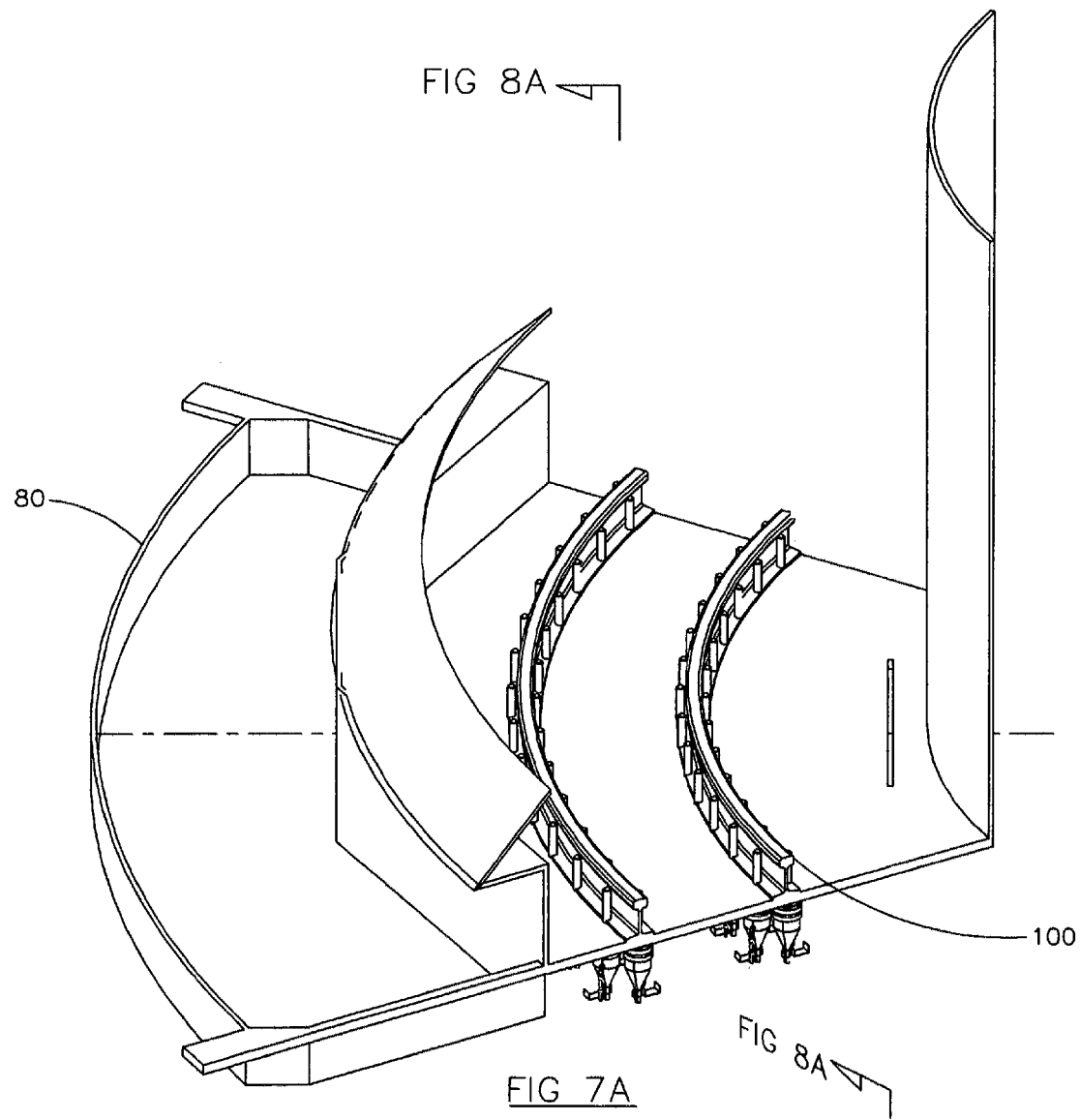

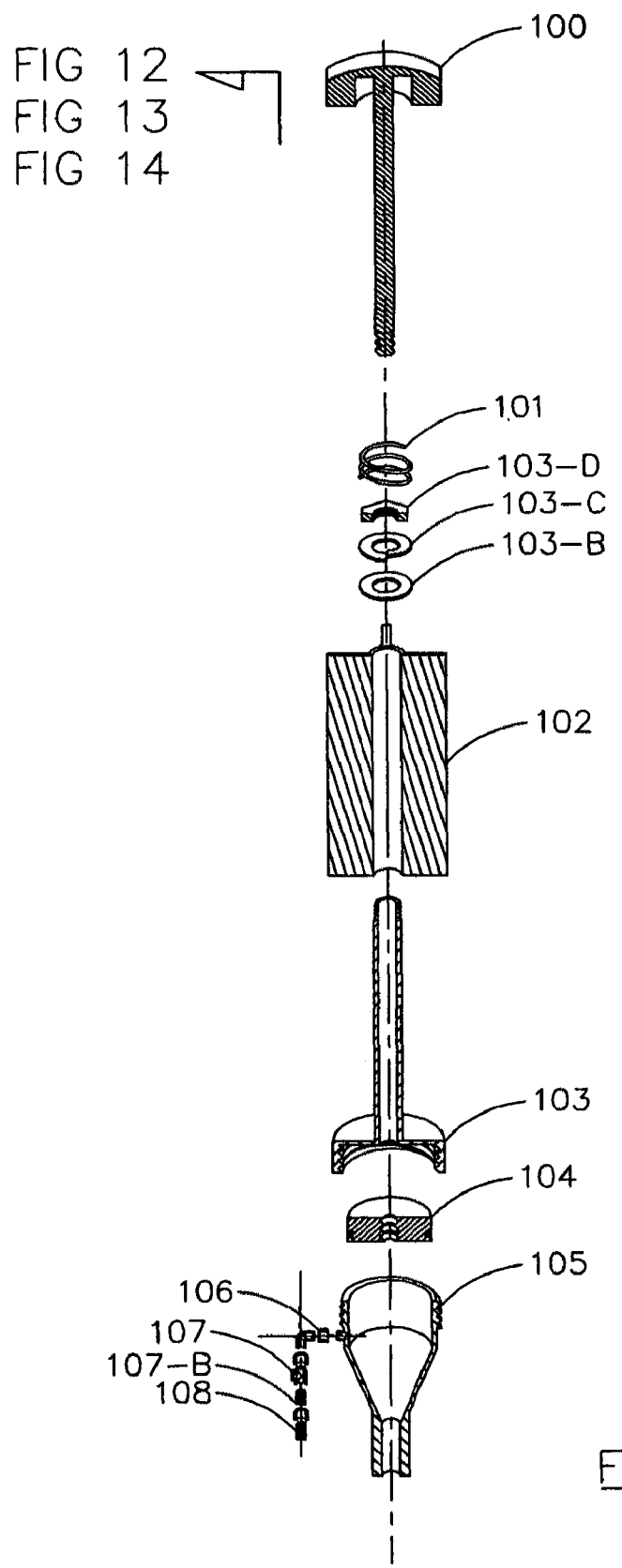

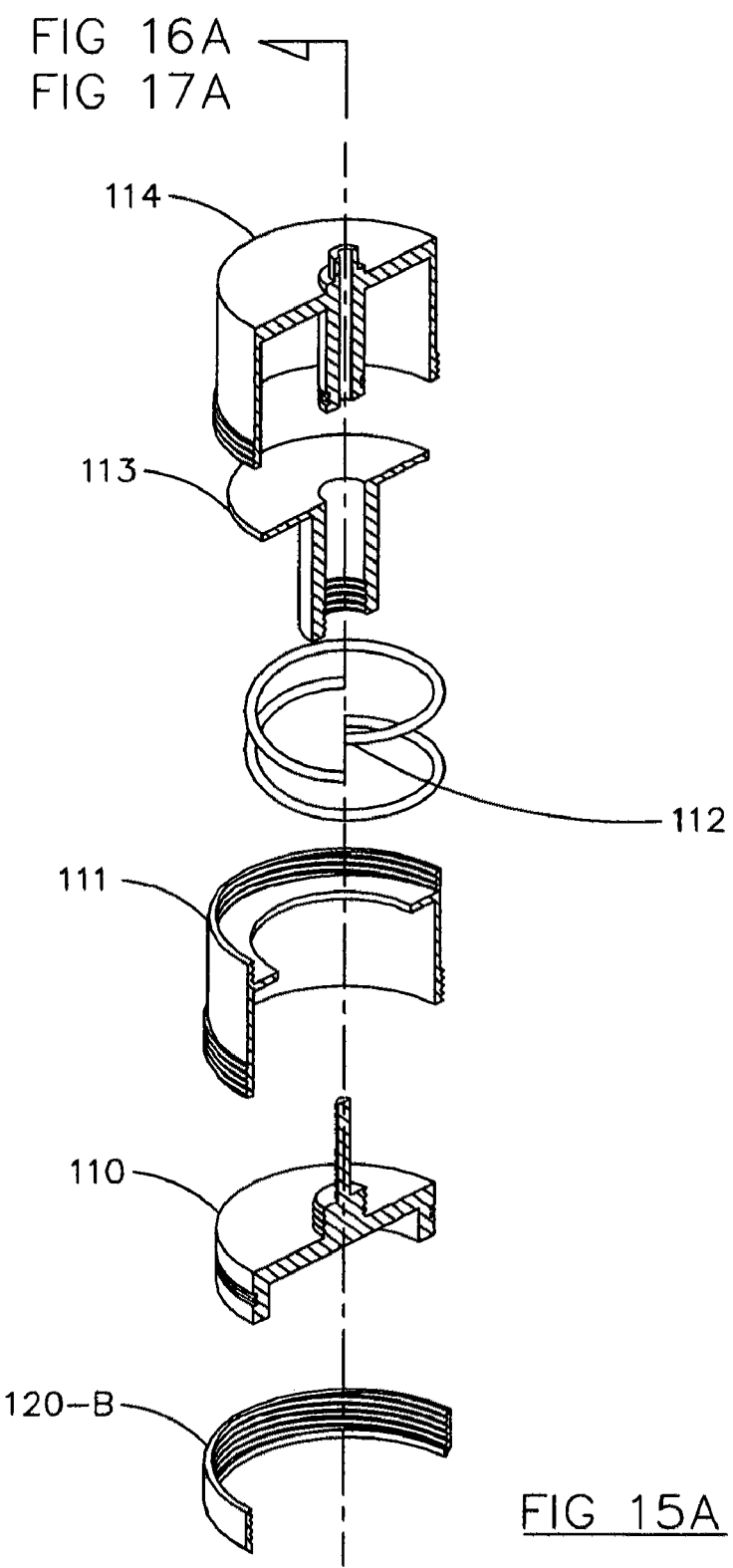

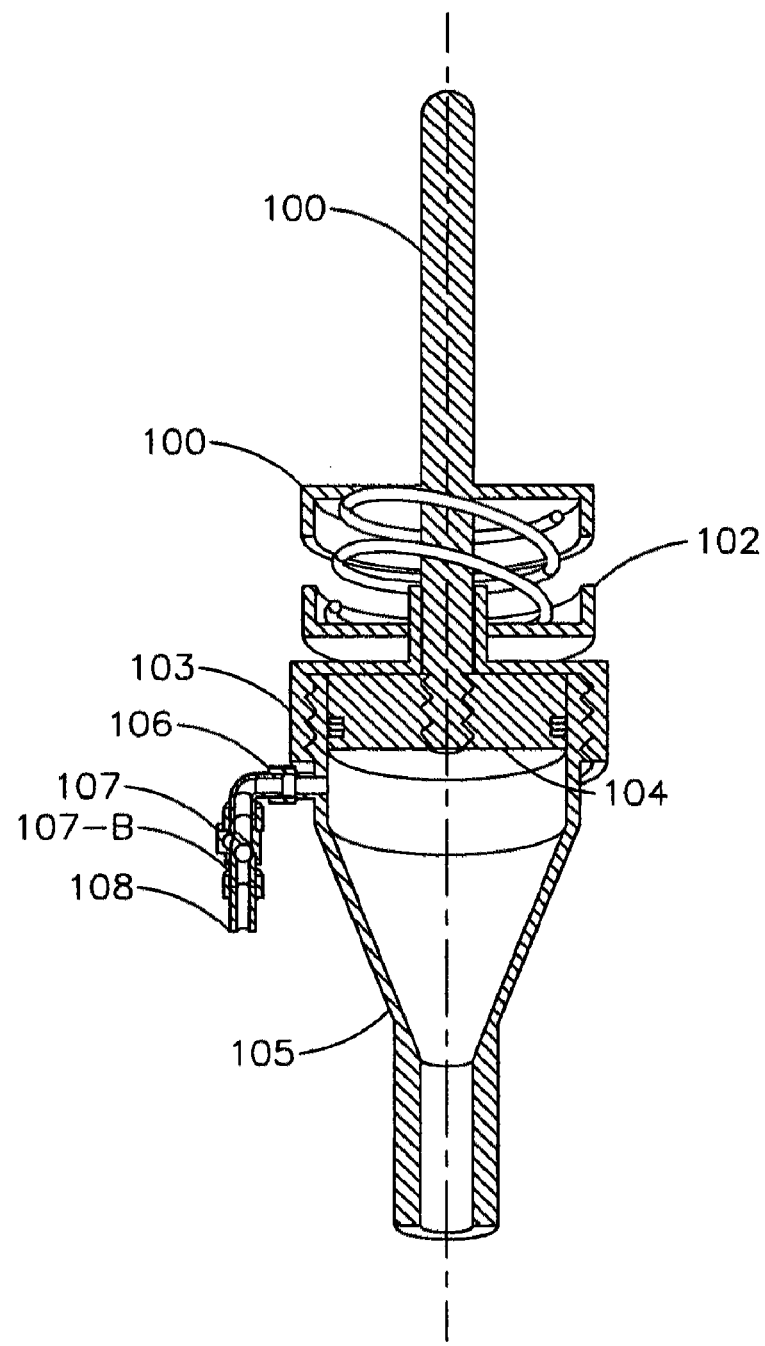

ENERGY RECOVERY DEVICE

BACKGROUND OF THE INVENTION

The following invention relates generally to devices which recover energy. More particularly, the invention defines a powerplant, a fluid control system and a device for transferring energy in the form of pressure to another form of energy.

With ever increasing traffic flow, it is apparent, especially on highways and railtrack sections experiencing heavy traffic that much of the kinetic energy associated with a vehicle and the force of gravity defining the weight of the vehicle goes totally unharnessed when the vehicle passes over all sections of roadway or track.

More importantly, a considerable resource, namely the kinetic energy and pressure associated with the vehicle on the road surface has largely been ignored in terms of its reclamation value into other forms of energy, and the instant application directs itself to recovering a portion of the energy currently dissipated.

REFERENCES CITED

| | |
|---|---|
| Mennie | 2,029,828 |
| Rodman et al | 2,355,241 |
| Hawxhurst | 2,807,215 |
| Wallin | 3,908,318 |
| Erb | 3,986,354 |
| Cox | 3,995,965 |
| LeVan | 4,004,422 |
| Gillilan | 4,086,765 |
| Smith | 4,115,034 |
| Smith | 4,173,431 |
| Williams | 4,300,352 |
| Lounsberry, Jr. | 4,334,596 |

The following patents reflect the state of the art which the applicant is aware, insofar as these patents appear to be germane to the process at hand.

| | |
|---|---|
| Wallin | 3,908,318 |
| Cox | 3,995,965 |
| LeVan | 4,004,422 |
| Smith | 4,115,034 |
| Smith | 4,173,431 |
| Williams | 4,300,352 |

The patent to LeVan teaches the use of a method and apparatus for allowing moving traffic to generate electricity by having the weight of traffic roll over a deformable chamber which is filled with fluid arranged so that the weight of the vehicle causes a displacement of the fluid there within. The energy of the displaced fluid in turn is translated into mechanical or electrical energy.

Each patent to Smith teaches the use of compressor systems which are activated by vehicles or the like in which a cylinder has disposed there within a piston which is capable of motion based on loads imposed by road vehicles, and appropriate valving is provided communicating with the cylinder so that the vehicle's depression of the piston provides useful work.

By way of contrast, the instant application is distinguished over the known prior art in that an instrumentality has been provided which recovers energy normally not harnessed and is derived from the weight and motion of vehicular traffic that includes at least one module disposed within a section upon which vehicular traffic occurs the module includes a deformable portion responsive to the flow of traffic, the module adapted to be conditioned by the presence of traffic, and a instrumentality for deriving energy from the module fluidic systems.

More particularly, the interface instrumentality such that fluid flow induced defines a corresponding, amplified deflection fluid flow, and a means for causing the fluid flow conditions a transferal in energy in the output. The invention contemplates providing a powerplant for converting the energy from its one form to another in such a manner that a fluid contained in a source is cyclically moved from a first to a second position in a substantially reciprocal path. Thereafter, useful work is extracted.

More particularly, a cluster of thrust rods are disposed in a module oriented to extend somewhat beyond the surface of a road or trackway adapted to receive vehicular traffic thereon, the thrust rod fastened to reciprocate in the presence of vehicular traffic and spring biased to return the thrust rod to an original, unstressed position. Each deflection of an associated thrust rod causes a fluid contained within a hydraulic cylinder to be pulsed in response to pressure formed from a piston associated with the thrust rod, the thrust rod operating against spring tensioning to return to its unstressed state. Each fluid pulse is allowed to communicate through a single fluidic line to a second piston and cylinder arrangement having a reduced cross section for a pulse of greater intensity and deflection, and spring biased to return to an original, unstressed position simultaneously with the thrust rod. This piston cylinder arrangement provided with double sided piston surfaces, one surface remote from the single fluidic line fluid. The remote surface deflection communicates with a pump/manifold system communicating with a reservoir allowing its fluid to travel in a fluid conduit past a turbine and generator arrangement or a similar instrumentality for the useful output associated with a liquid impinging against the turbine's blades. Tailwater from the turbine flows to a reservoir to be reinitialized. In one form of the invention, a plurality of thrust rods are provided, ganged to a single fluidic line and associated reduced piston/cylinder arrangement, so that when operated in a synchronous manner, the fluid reverting into the initial thrust rod does not interfere with successive depressions of adjacent or remote thrust rods, so that a single fluidic line can be used to accommodate a plurality of thrust rods. In another form of the invention, the module assembly is coupled with an associated flywheel to render more constant the work pulses delivered as useful energy, and it is contemplated that a single electrical input be utilized with the flywheel to make the energy system reversible.

SUMMARY AND OBJECTS OF THE INVENTION

Accordingly, this invention has as an objective the provision of a new and novel energy recovery system for use with vehicular traffic.

It is another objective of this invention to provide a device as characterized above in which a fluid flow system allows two disparate pistons to be interfaced so that pressure pulses from a first piston are reflected by an associated enhanced pulse in the second piston.

A further object of this invention is to provide a power plant which converts energy from one form to another in which a fluid is adapted to travel in a fluid conduit past a turbine and generator arrangement or a similar instrumentality for the useful output associated with a liquid impinging against the turbine's blades. Tailwater from the turbine flows to a reservoir to be reinitialized.

It is another object of this invention to provide a device as characterized above which harnesses energy which heretofore has not been utilized.

It is still yet another object of this invention to provide a device as characterized above which benefits from mass production techniques and can be formulated from a plurality of components which may be commercially available already.

It is still yet another object of this invention to provide a device as characterized above which benefits from economies of scale.

It is still yet another object of this invention to provide a device as characterized above which is modular in form so that a plurality of modules can be installed and or replaced as is necessary as for servicing or enhancing the system by enlargement.

It is still yet another object of this invention to provide a device as characterized above a device as characterized above which exhibits longevity and long service.

It is still yet another object of this invention to provide a device as characterized above which reproduces with a high degree of fidelity and a minimal amount of instream frictional losses a useful work output.

It is still yet another object of this invention to provide a device as characterized above in which a plurality of such instruments can be synchronized in such a manner that devices sensitive to vertical translation as by pressure be oriented to allow a single conduit to communicate with a plurality of such pressure sensitive instrumentalities.

These and other objects will be made manifest when considering the following detailed specification when taken in conjunction with the appended drawing figures.

BRIEF DESCRIPTION OF THE DRAWING FIGS. 1-15

BRIEF DESCRIPTION OF THE DRAWING FIGS. 1A-21A OF AN ALTERNATIVE POWER PLANT

Figure 1:
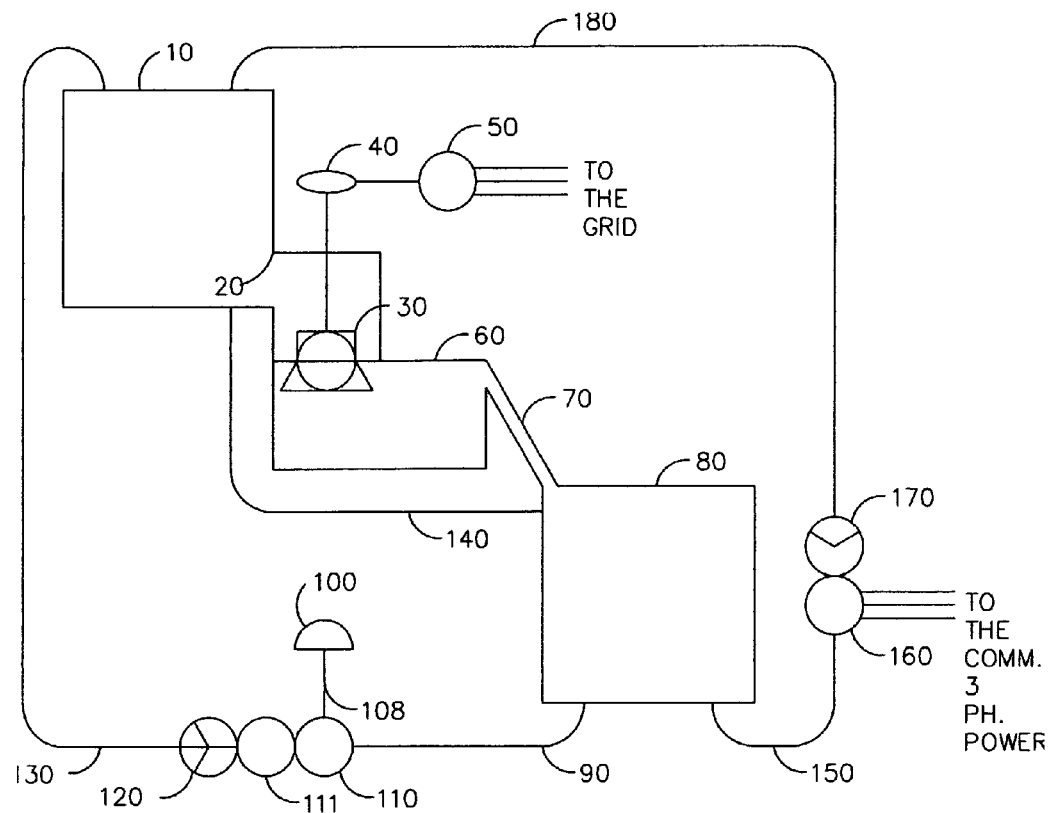
FIG. 1 is a side view schematic depiction of a closed circuit power plant in accordance with the present invention instant to roadways or highways vehicular traffic.
Figure 1A:
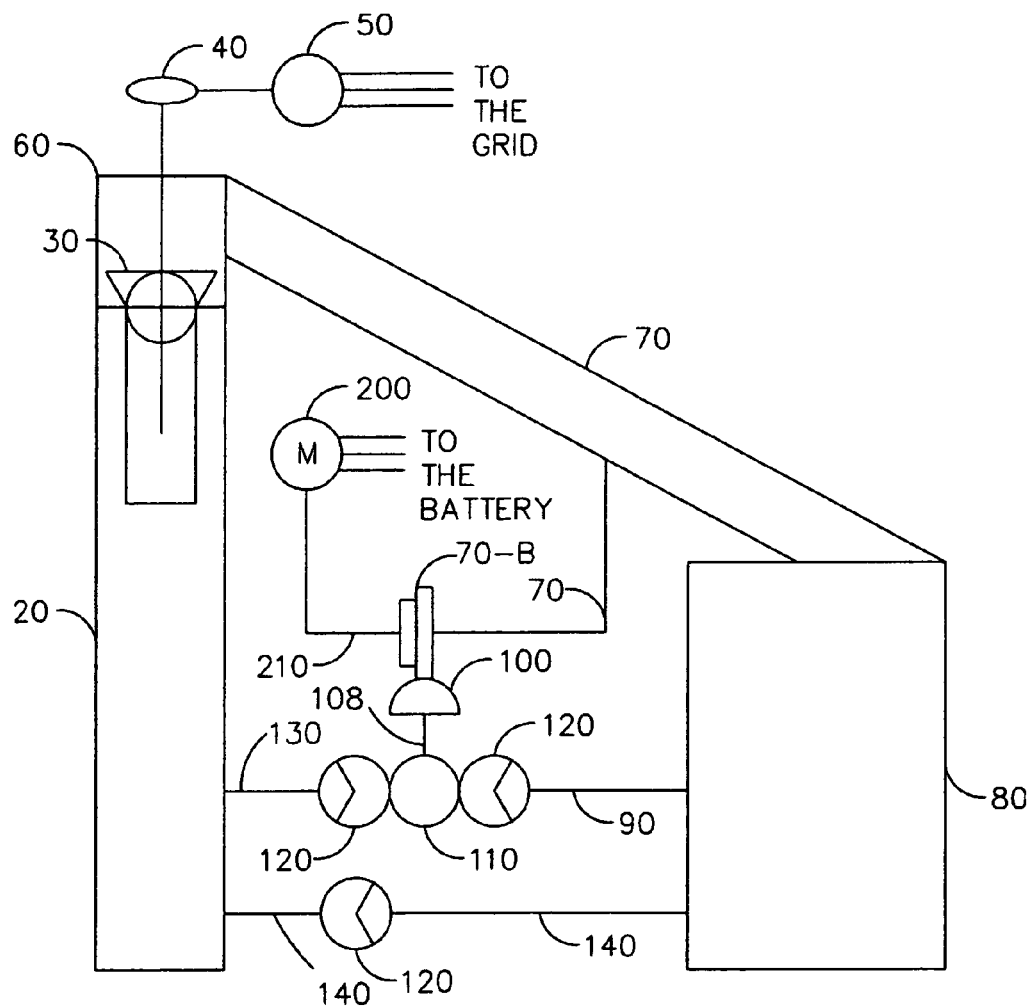

FIG. 1A is a side view schematic depiction of a closed circuit alternative power plant in accordance with the present invention instant to railtrack vehicular traffic.

Figure 2:
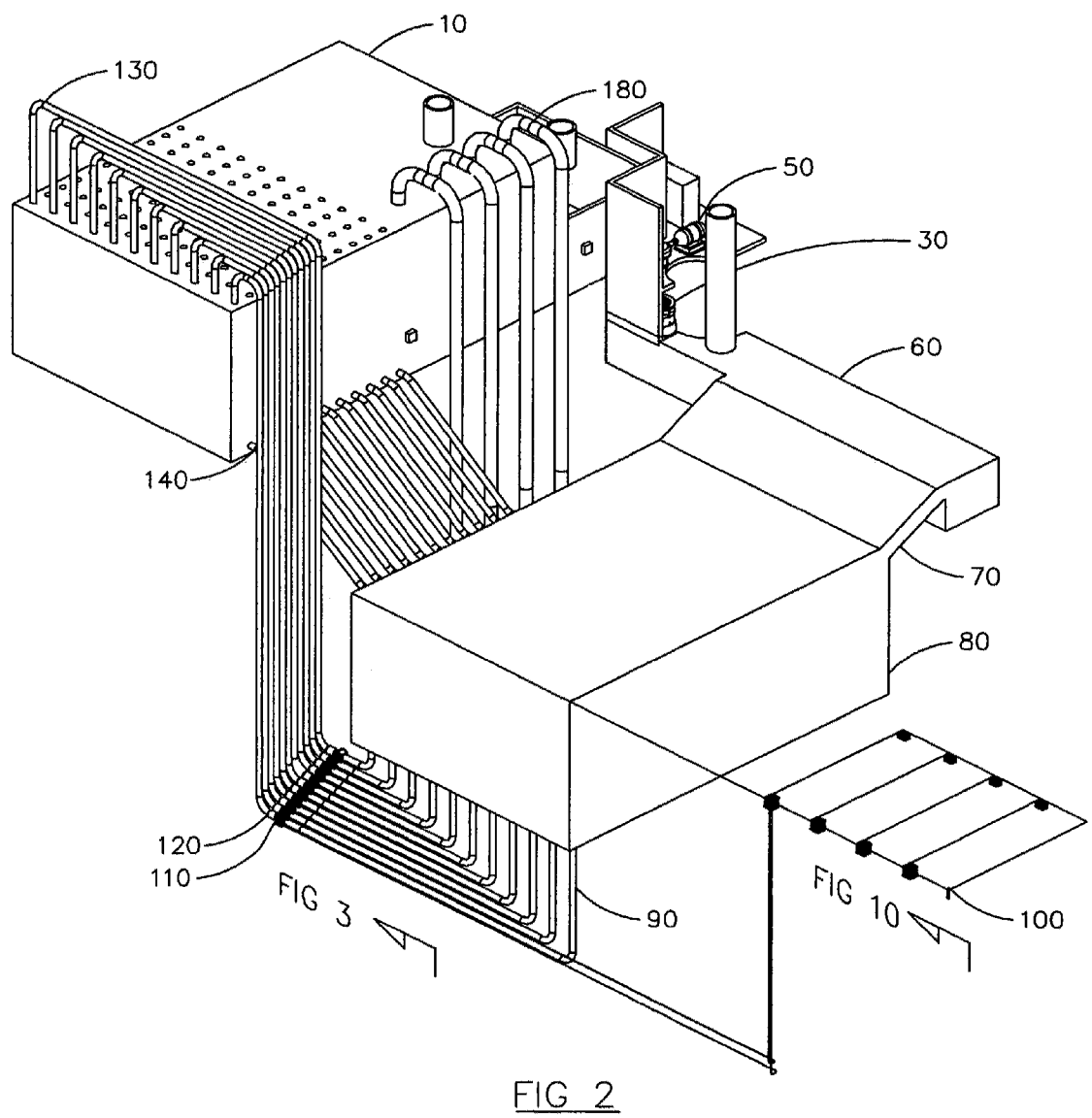
FIG. 2 is a perspective depiction of a closed circuit in accordance with the present invention instant to roadways or highways vehicular traffic with only one column of return line shown for the sake of clarity.
Figure 2A:
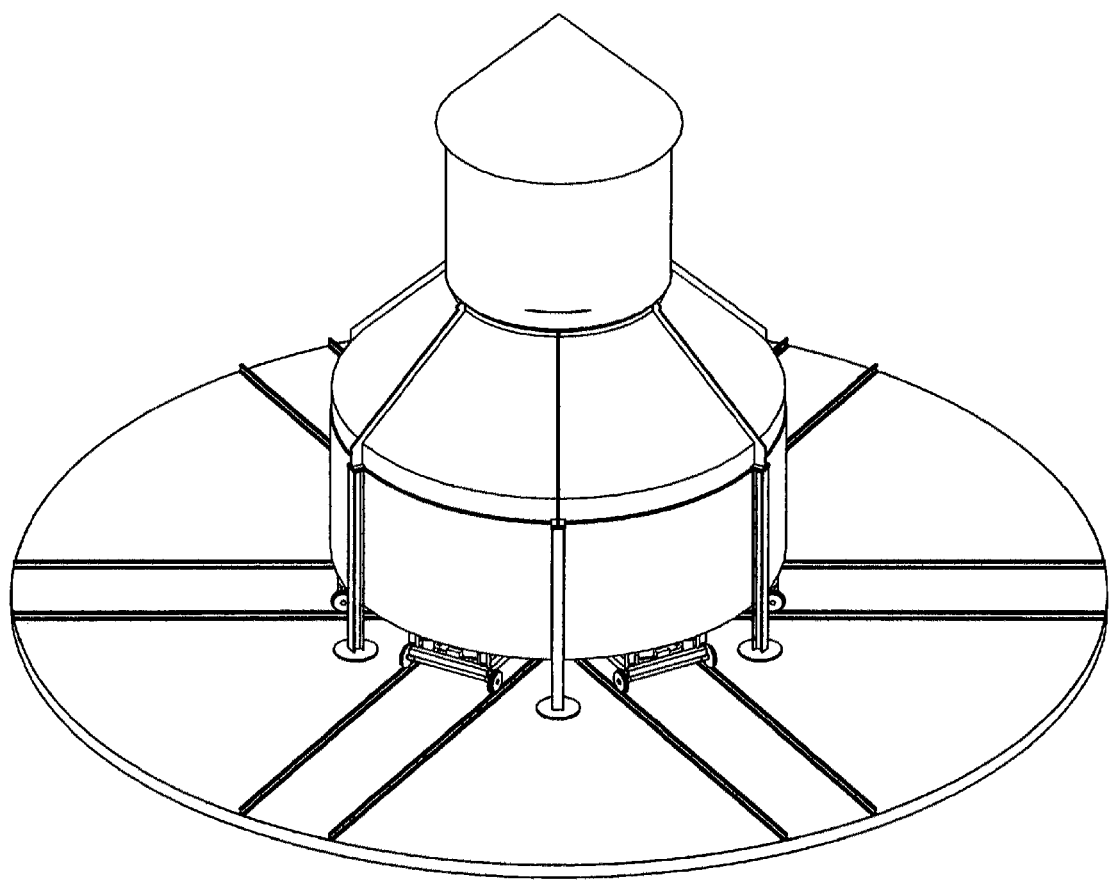

FIG. 2A is a perspective depiction of an closed circuit alternative power plant in accordance with the present invention instant to railtrack vehicular traffic.

Figure 3:
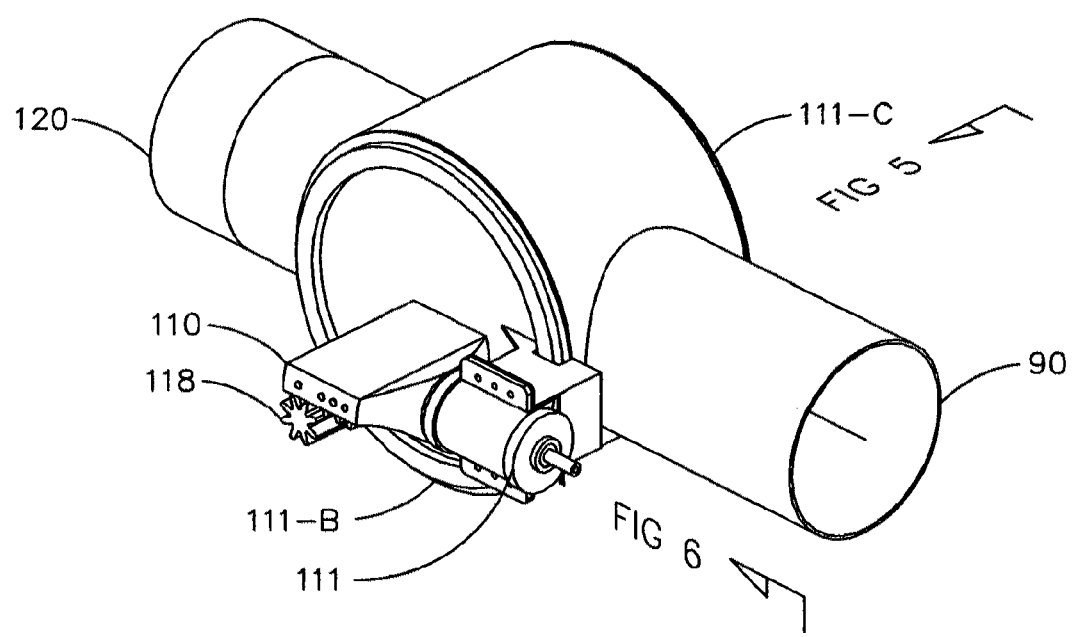
FIG. 3 is a perspective depiction view of FIG. 2 of Pump 110 and associated components of Gear 118, Pump Actuator 111, Covers 111-B, and C, Drain Line 90, Backflow Valve 120.

FIG. 3A is a perspective depiction view of FIG. 2A of a single module with associated components of Pump 110, Actuators 100, Wheels 70-B, Water channel 60, Spillway 70, Reservoir 80, Motor 200, Generator 50.

Figure 4:
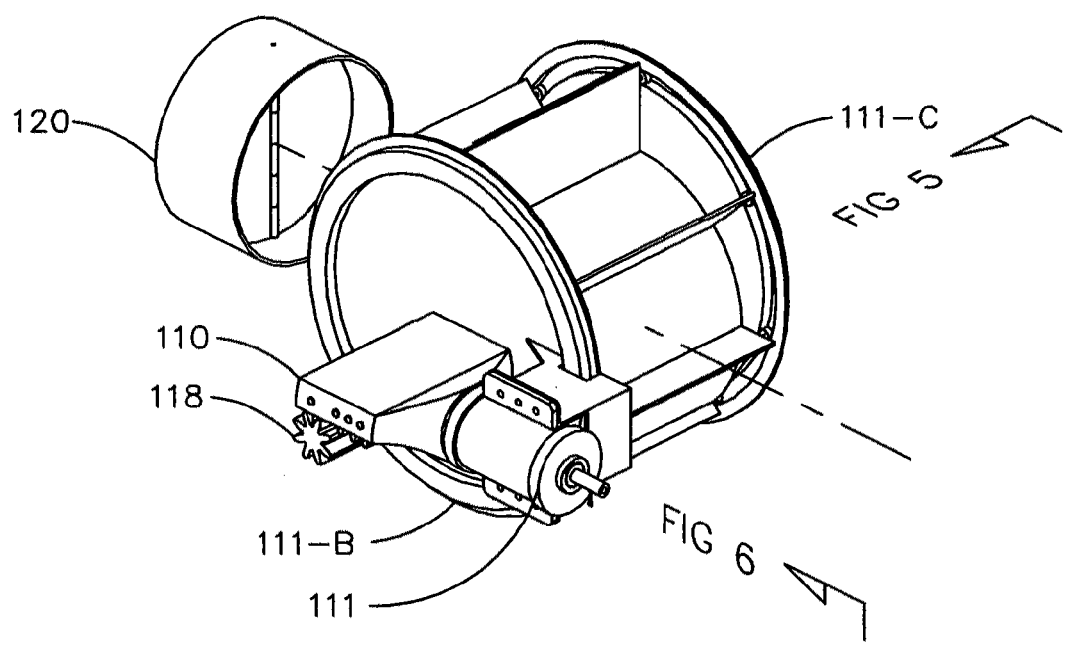
FIG. 4 is a perspective depiction without pump housing and pipes for clarity of Pump 118 and associated components of Gear 118, Pump Actuator 111, Pump Actuator Mount 111-B, Covers 111-B, and C, Backflow Valve 120.

FIG. 4A is a perspective depiction view of FIG. 3A of a single module of FIG. 3A and associated components of Pump 110, Actuators 100, Wheels 70-B, Water channel 60, Spillway 70, Reservoir 80, Motor 200, Generator 50 with housings partially removed for clarity.

Figure 5:
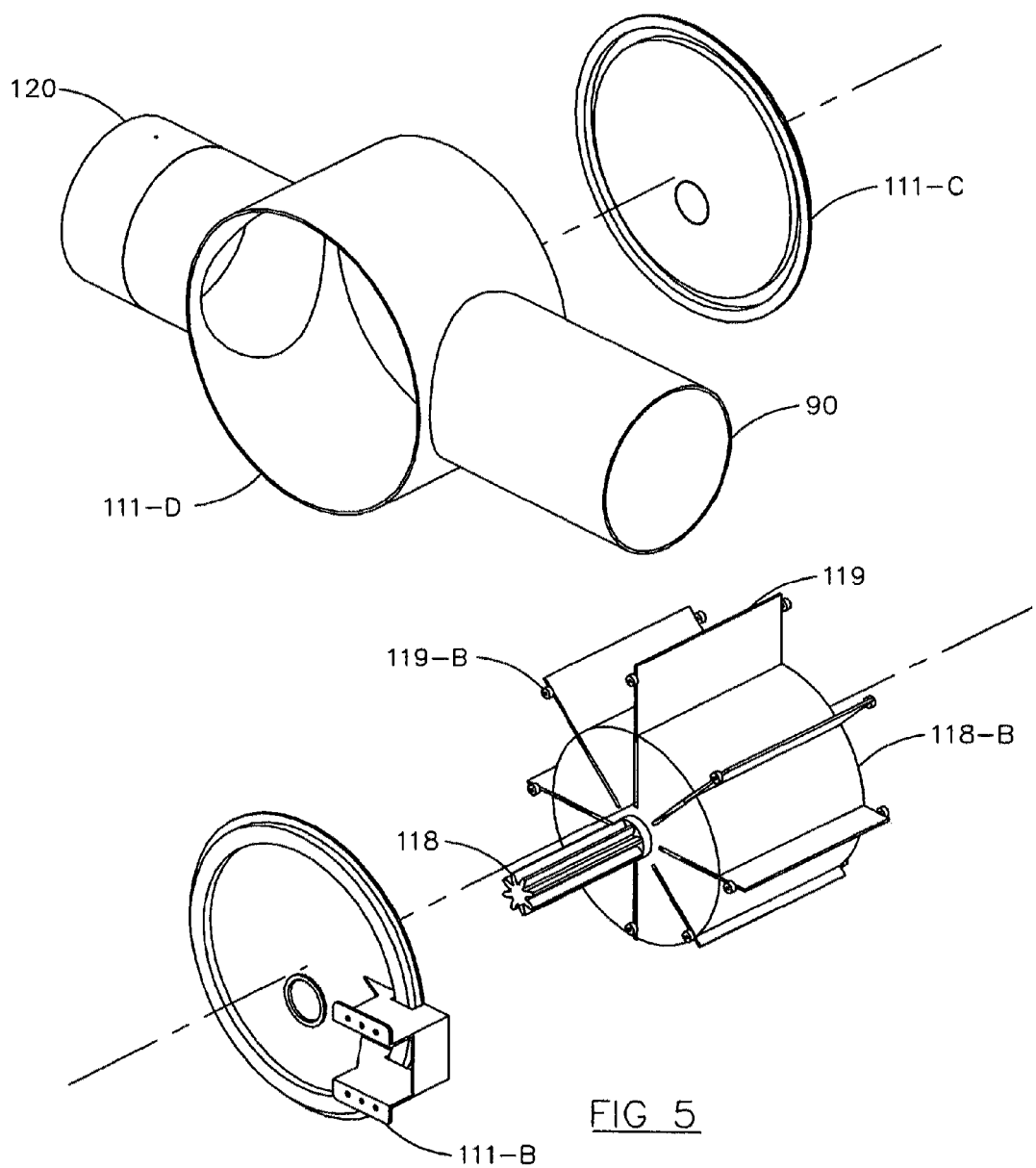
FIG. 5 is a exploded parts view in perspective depiction of FIG. 4 Housing 111-D and associated components of Pump Actuator Mount 111-B, Covers 111-B, and C, Drain Line 90, Backflow Valve 120, Gear 118 and associated components Drum 118-B, Blades 119, Rollers 119-B.
Figure 5A:
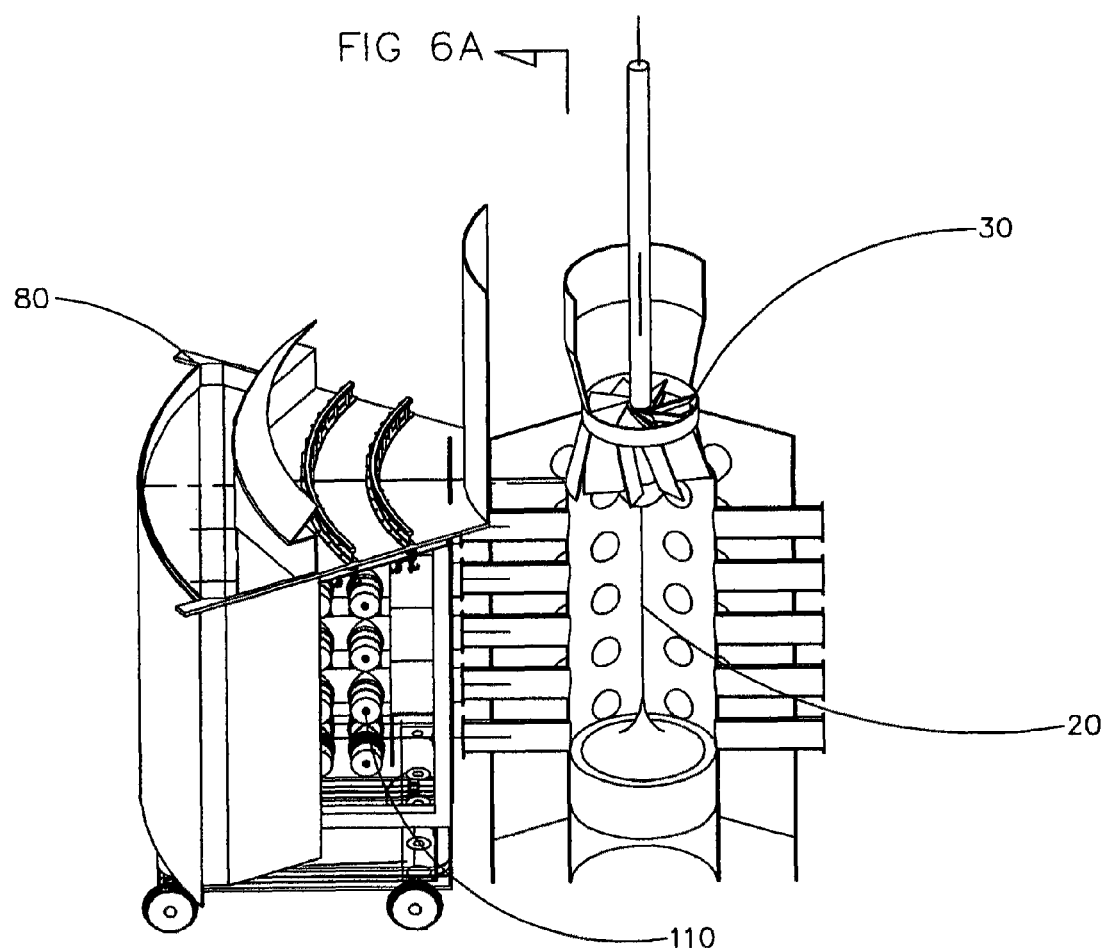

FIG. 5A is a perspective depiction of a single module of FIG. 4A and associated components of Pump 110, Actuators 100, Head Control 20, Reservoir 80, Turbine 30.

Figure 6A:
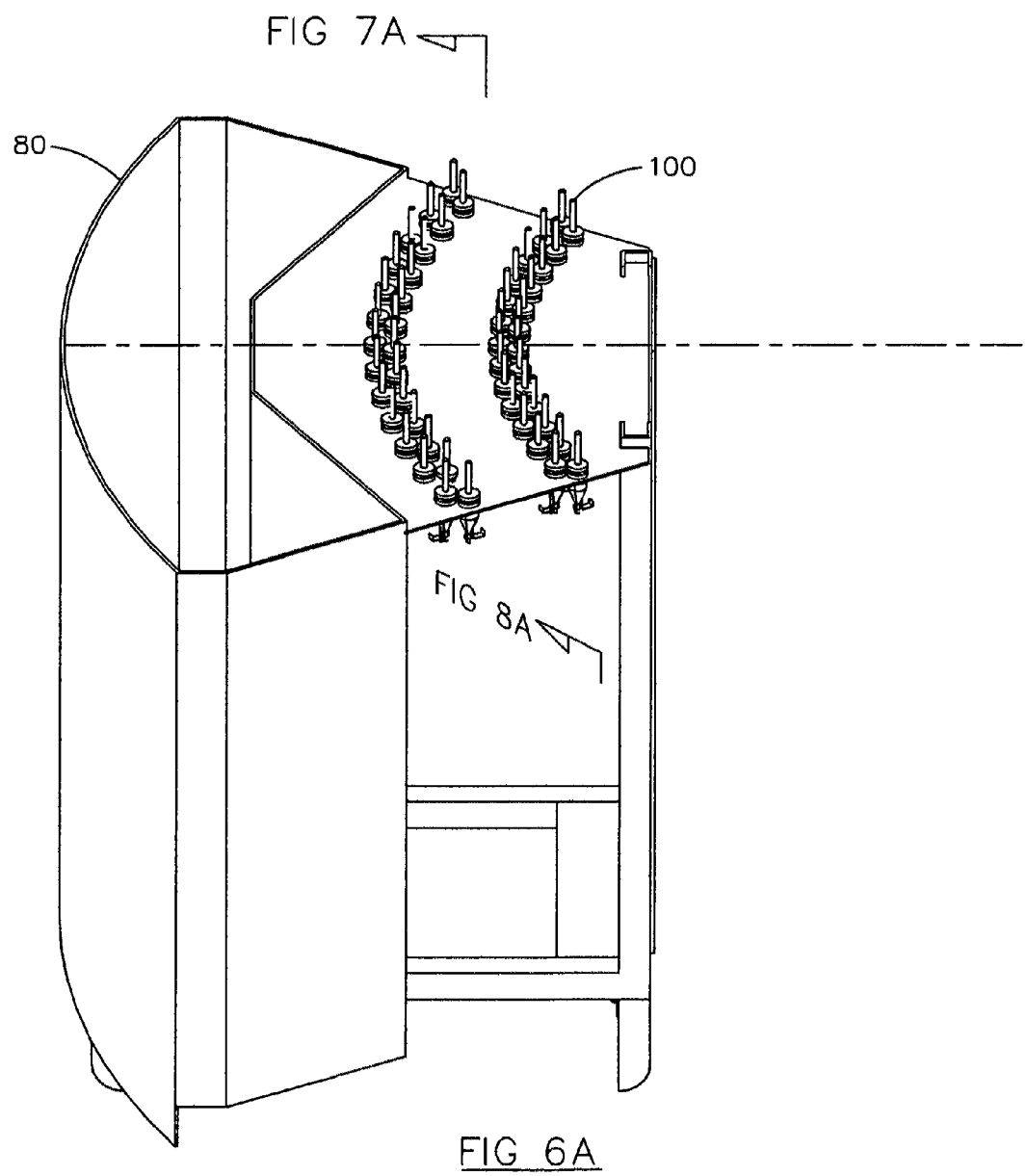
Figure 8:
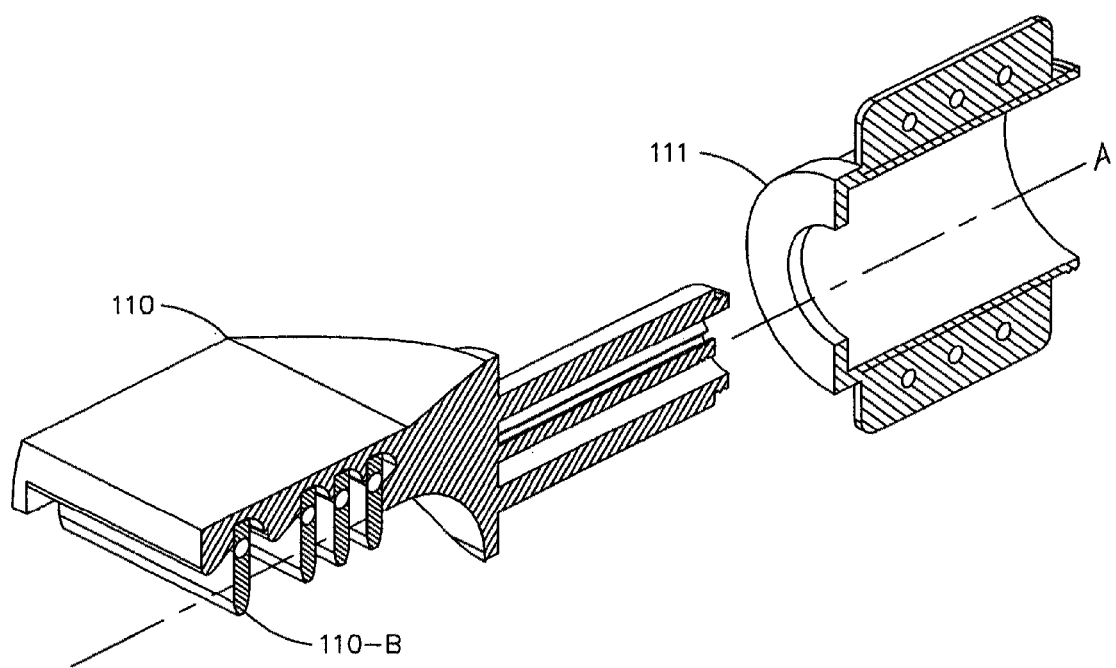
FIG. 8 is a exploded parts section view in perspective depiction of FIG. 7 of Pump 110 and associated components Thrust Pawl Ratchet 110-B, Spring 112 Cylinder Housing 111.

FIG. 6A is a perspective depiction of FIG. 5A of a single module's Thrust Rod 100 arrangement and Reservoir 80.

FIG. 7A is a perspective depiction of FIG. 6A of a single module's Railtrack with Thrust Rod 100 arrangement and Reservoir 80.

Figures 8A, 18A:
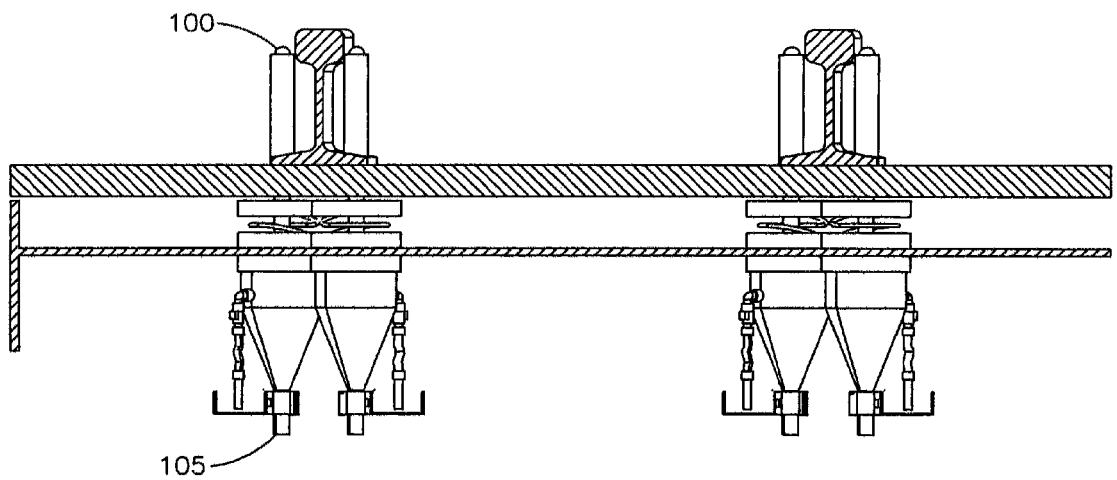

FIG. 8A is a partial section view perspective depiction of FIG. 7A of a single module's Railtrack Level with Thrust Rod 100 arrangement.

Figure 9:
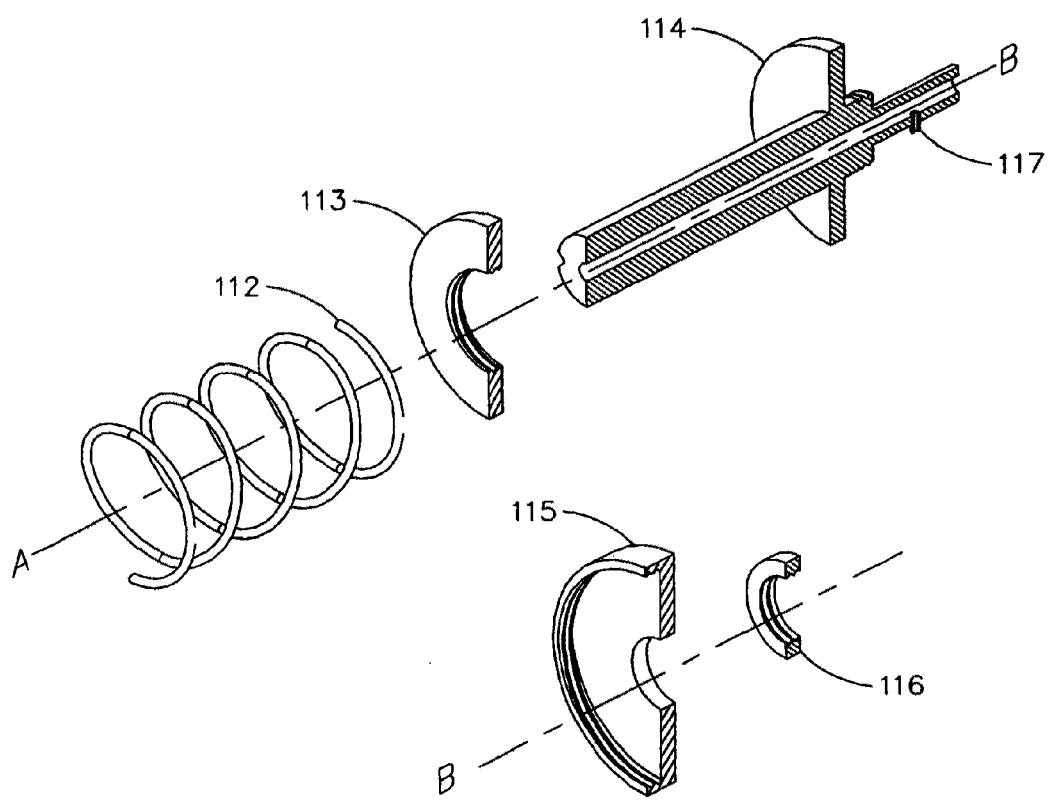
FIG. 9 is a exploded parts section view in perspective depiction of FIG. 7 of Pump 110's associated components Spring 112, Connector 113, Cylinder 114 with Bleed Valve 117, Spring 112 Cylinder Housing 111 Connector 115, Cylinder 114 Connector 116.
Figure 9A:
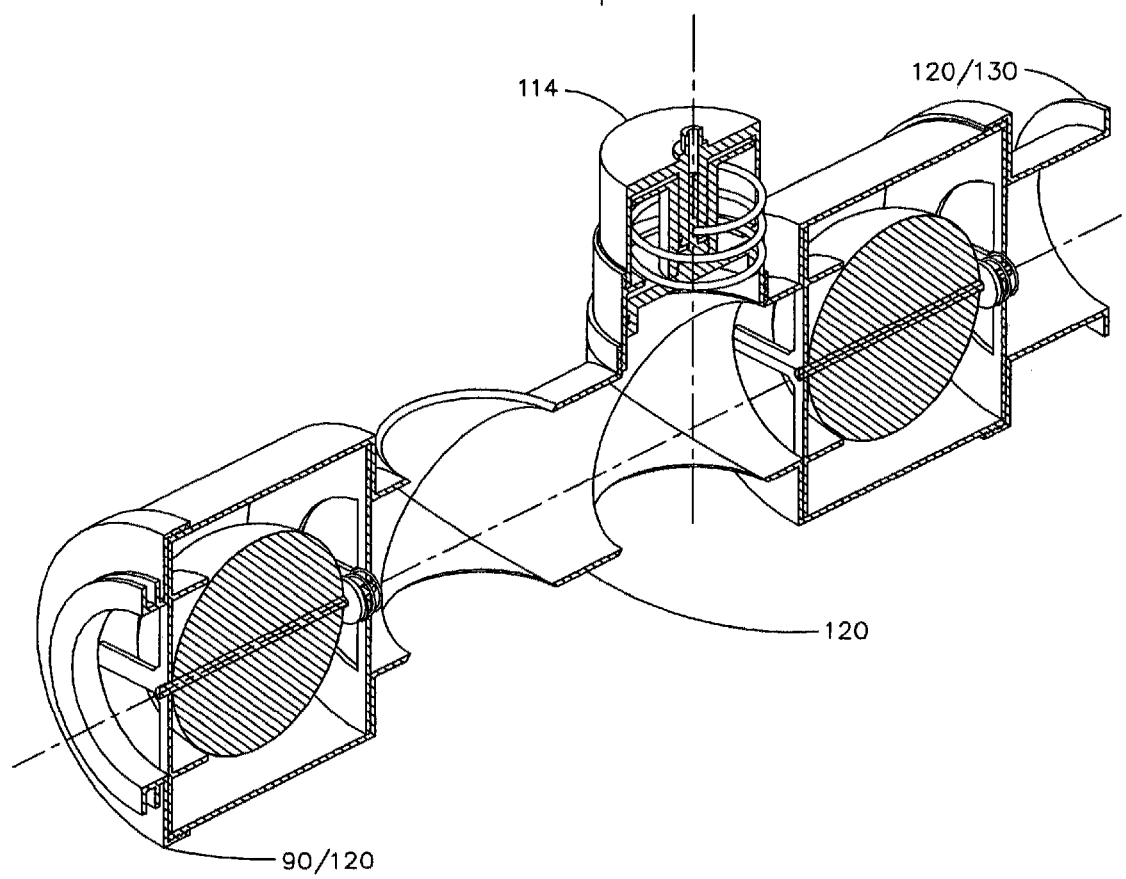

FIG. 9A is a section view perspective depiction of a single module's associated components of Pump Manifold 120, Pump 110 Housing Cylinder 114, Backflow Valves 90/120 and 120/130 arrangement.

Figure 10:
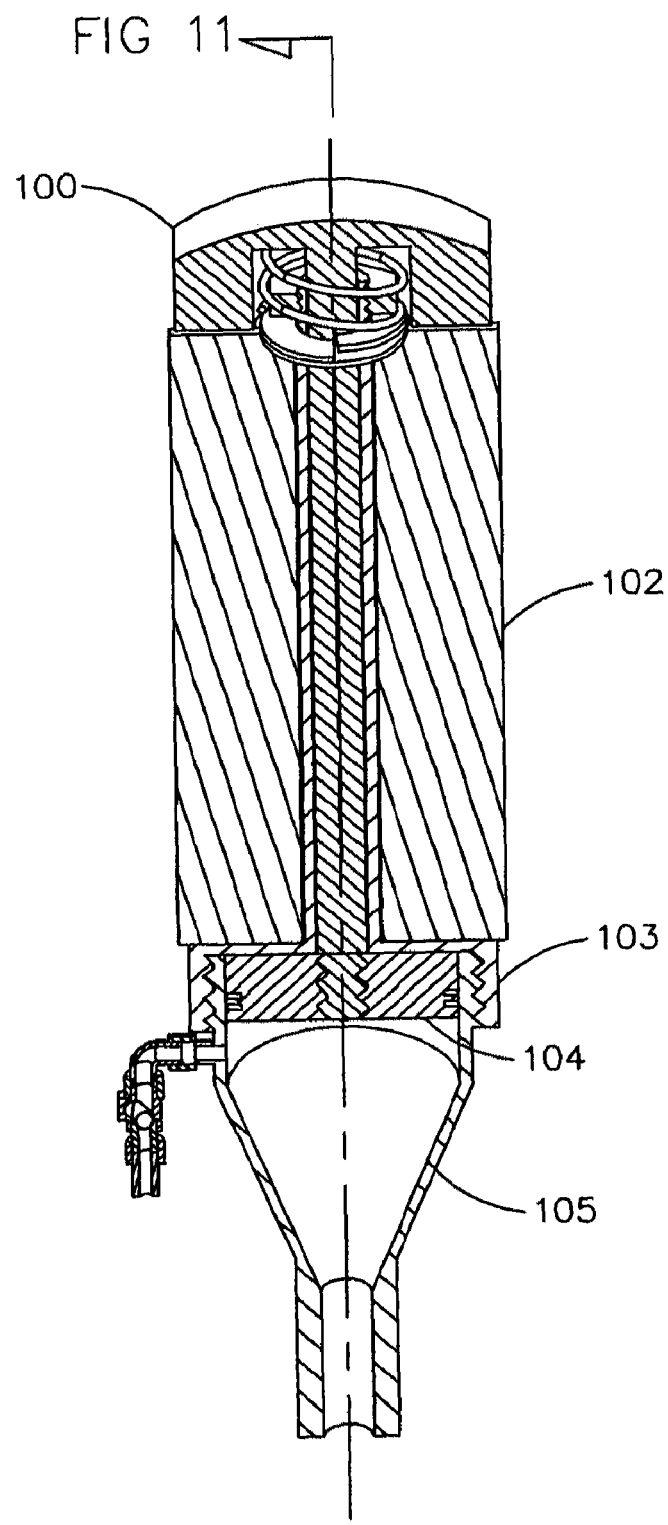
FIG. 10 is a section view perspective depiction of FIG. 2 view of Actuator Thrust Rod 100 and associated components Partial Grating 102, Thrust Rod Sleeve 103, Piston 104, Cylinder 105.
Figure 10A:
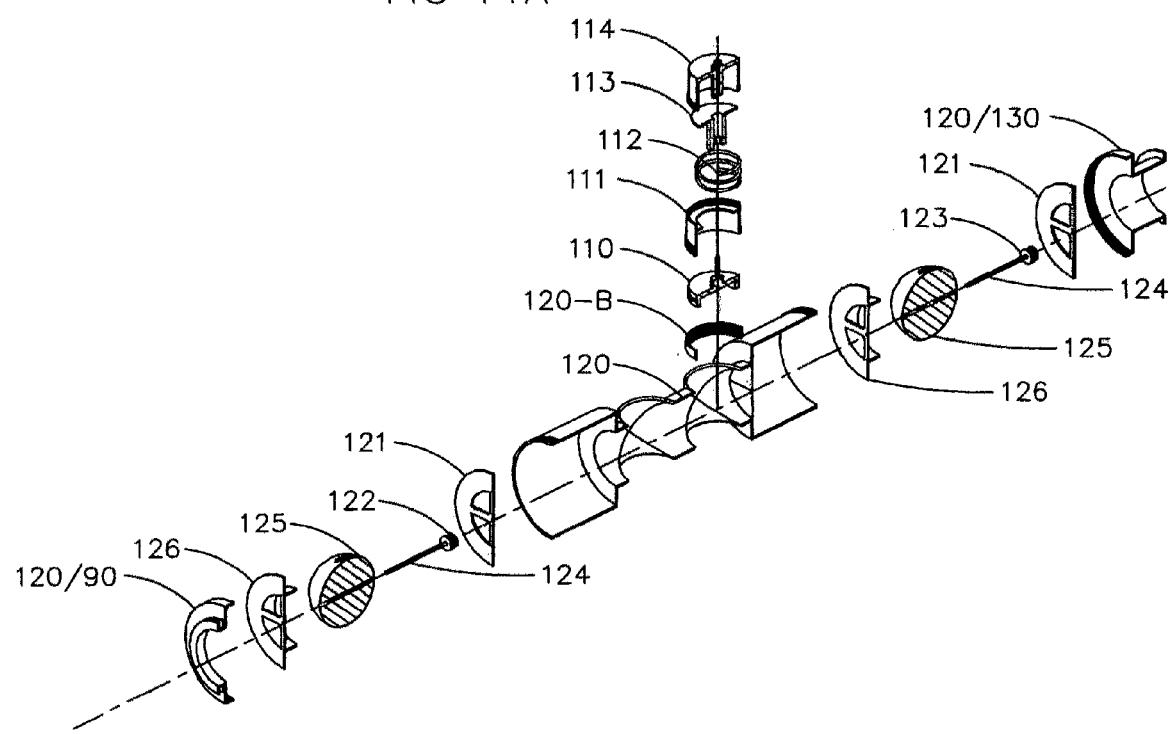

FIG. 10A is a exploded parts section view perspective depiction of a single module's associated components of Pump Manifold 120, Pump 110 Housing Cylinder 114, Backflow Valves 90/120 and 120/130 arrangement, Ball Check 125, Spindle Axle Pin 124, Biasing Spring 122, Washer 123, Spindle Axle Pin Supports 121 and 126.

Figure 11A:
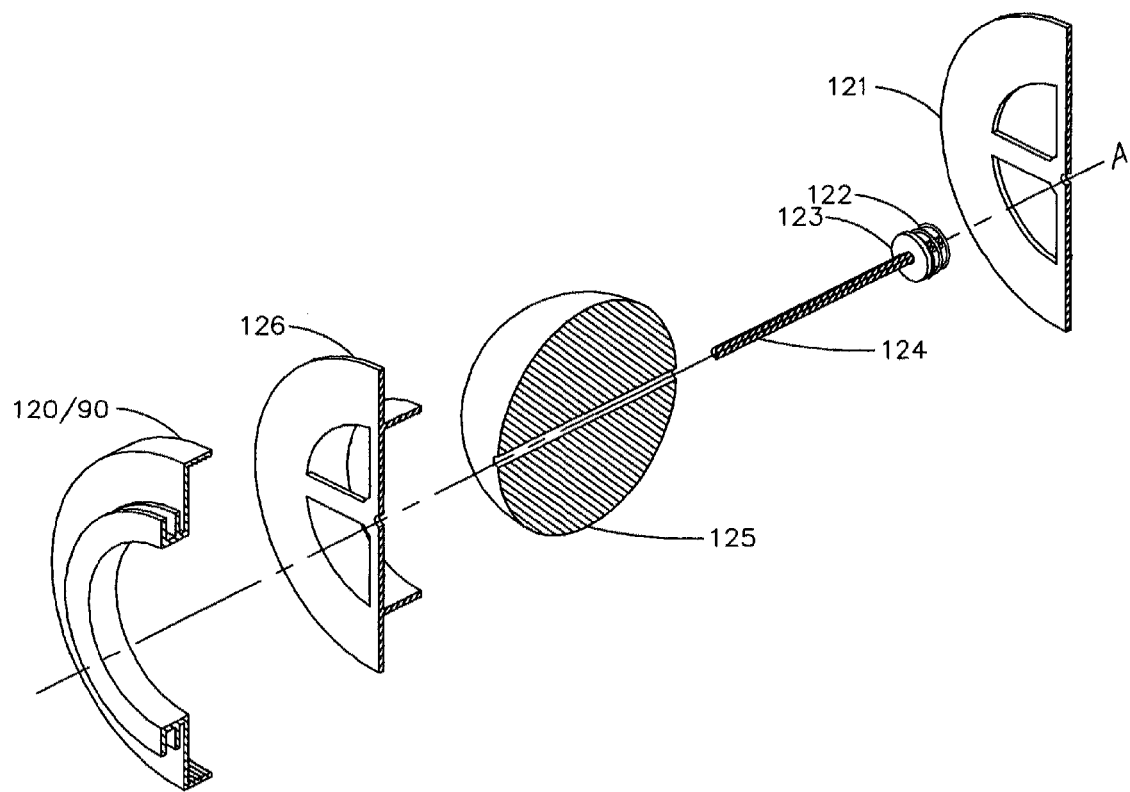
FIG. 11 is a exploded parts section view in perspective depiction of FIG. 10 of Actuator Thrust Rod 100 and associated components Spring 101, Hex Nut 103-D, Lock Washer 103-C, Washer 103-B, Partial Grating 102, Thrust Rod Sleeve 103, Piston 104, Cylinder 105, and associated components Partial Grating 102, Thrust Rod Sleeve 103, Piston 104, Cylinder 105.

FIG. 11A is a exploded parts section view perspective depiction of FIG. 10A of Pump Manifold 120, Backflow Valve 90/120 Ball Check 125, Spindle Axle Pin 124, Biasing Spring 122, Washer 123, Spindle Axle Pin Supports 121 and 126.

Figure 12:
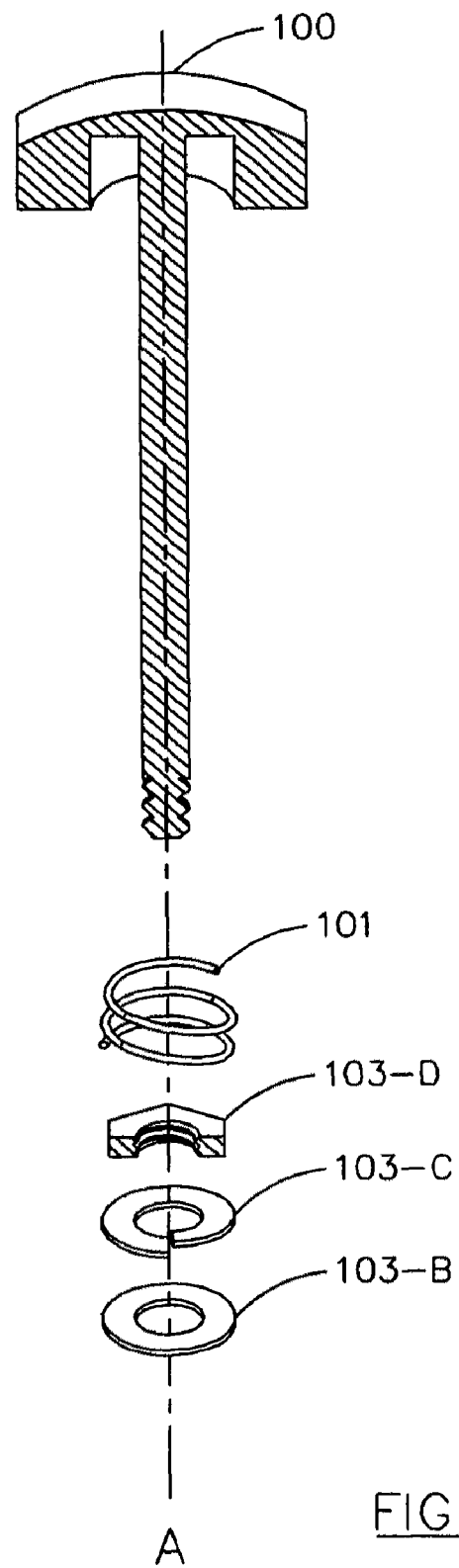
FIG. 12 is a exploded parts section view in perspective depiction of FIG. 11 of Actuator Thrust Rod 100 and associated components Spring 101, Hex Nut 103-D, Lock Washer 103-C, Washer 103-B.
Figure 12A:
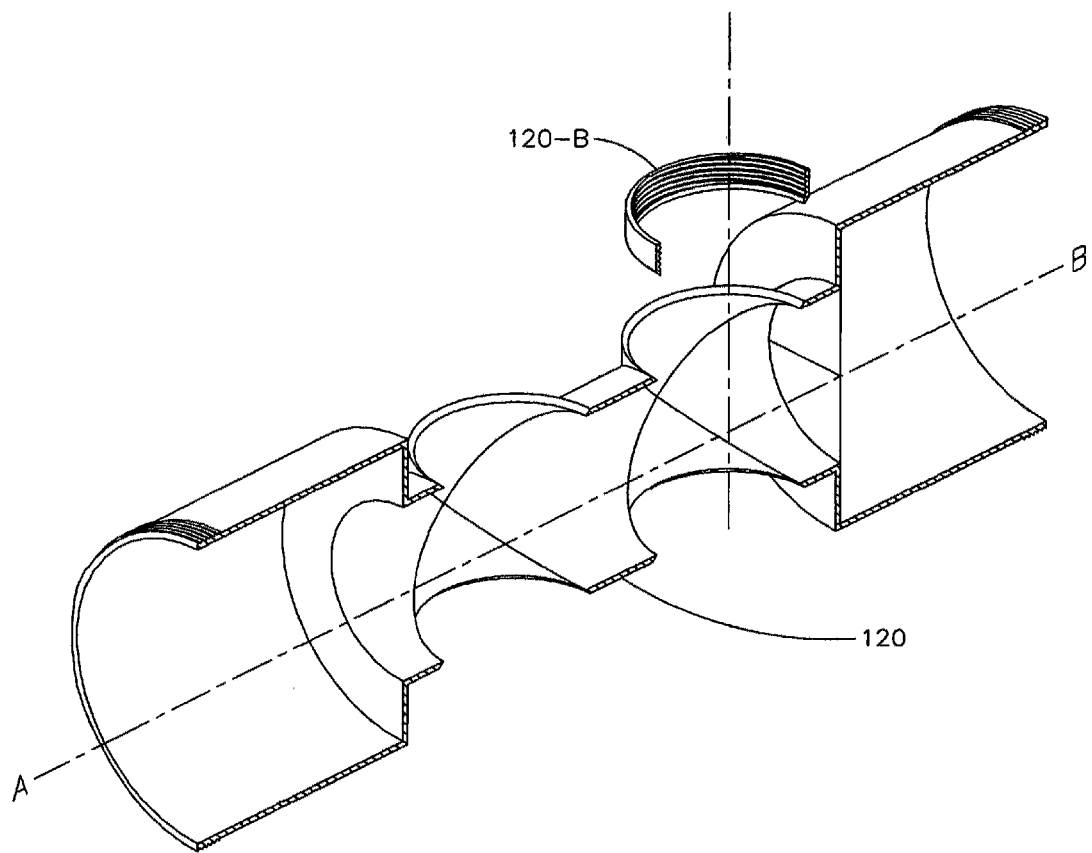

FIG. 12A is a exploded parts section view perspective depiction of FIG. 10A of Pump Manifold 120, Part 120-B, Backflow Valves 90/120 and 120/130 Ball Check Housing.

Figure 13:
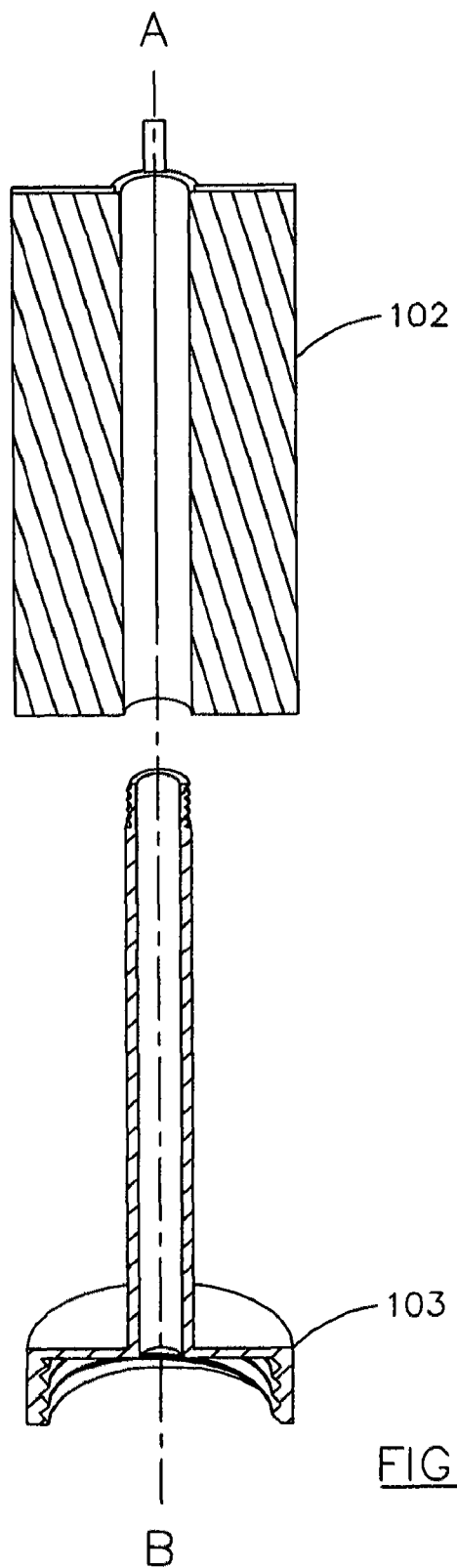
FIG. 13 is a exploded parts section view in perspective depiction of FIG. 11 of Partial Grating 102, Thrust Rod Sleeve 103.
Figure 13A:
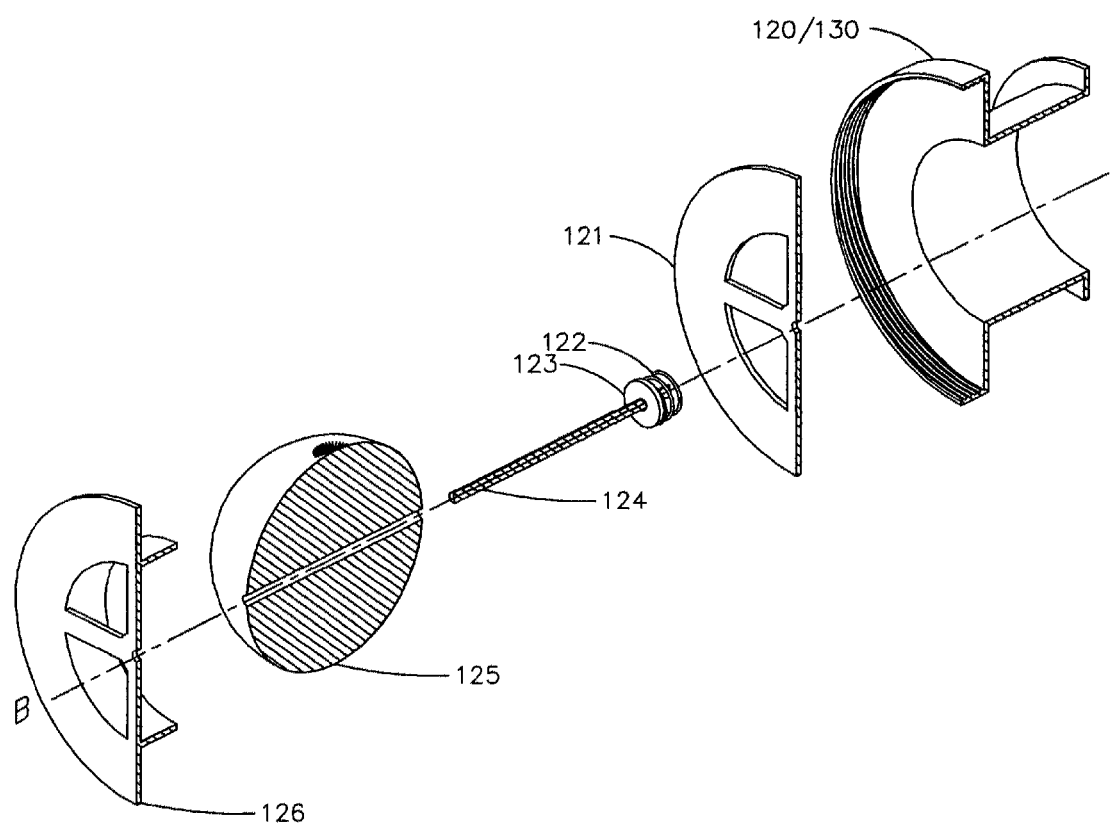
Figure 14:
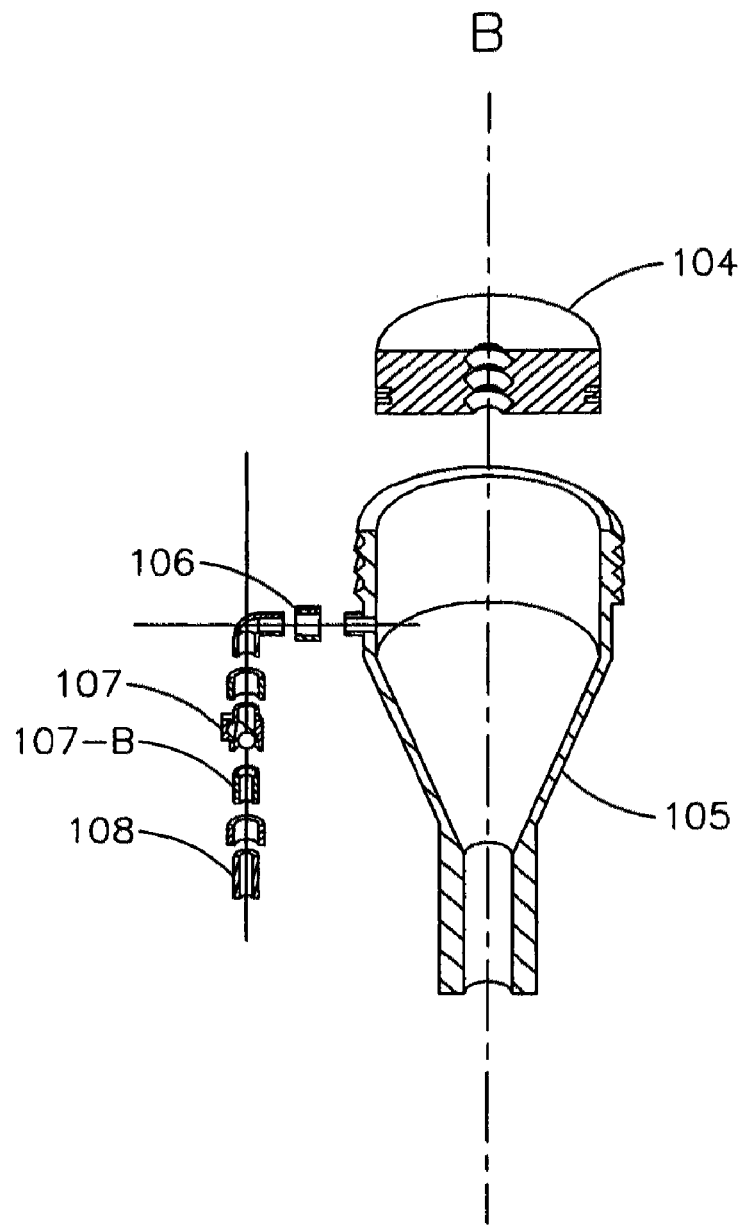
FIG. 14 is a exploded parts section view in perspective depiction of FIG. 11 of Piston 104, Cylinder 105, Snap Connector 106, Ball Check Valve 107, Ball Check Valve 107-B, Ball 107-C, Hydraulic Fluid Line 108.

FIG. 13A is a exploded parts section view perspective depiction of FIG. 10A of Pump Manifold 120, Backflow Valve 120/130 Ball Check 125, Spindle Axle Pin 124, Biasing Spring 122, Washer 123, Spindle Axle Pin Supports 121 and 126.

Figures 14A, 15A, 16A, 17A:
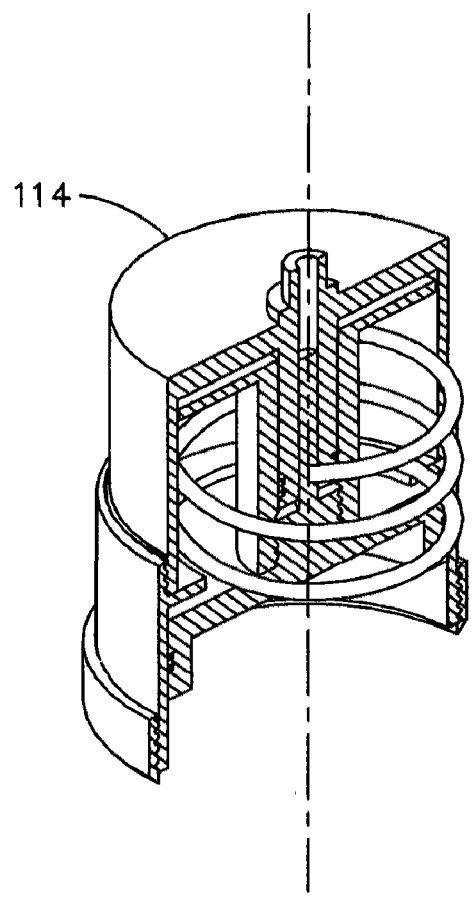
FIG. 15 is a section view perspective depiction of Cylinder 105, T-shaped Coupling 109, Plug 109-B, Ball 107-C, Snap Connector 106, Hydraulic Fluid Line 108.

FIG. 14A is a section view perspective depiction of a single module's associated components of Pump 110.

FIG. 15A is a exploded parts section view perspective depiction of FIG. 14A of associated components of Pump 110, Housing Cylinder 114, Pump Cylinder 113, Spring 112, Pump Cylinder 111, Pump Piston 110, Pump Manifold 120 Part 120-B.

FIG. 16A is a exploded parts section view perspective depiction of FIG. 15A of associated components of Pump 110, Pump 110 Housing Cylinder 114, Pump Cylinder 113, Biasing Spring 112.

FIG. 17A is a exploded parts section view perspective depiction of FIG. 15A of associated components of Pump 110, Pump Cylinder 111, Pump Piston 110, Pump Manifold 120 Part 120-B.

FIG. 18A is a section view perspective depiction of a single module's associated components of Actuator Thrust Rod 100 and associated components Thrust Rod Sleeve 103, Piston 104, Cylinder 105, Snap Connector 106, Ball Check Valve 107, Ball Check Valve 107-B, Ball 107-C, Hydraulic Fluid Line 108.

Figure 19A:
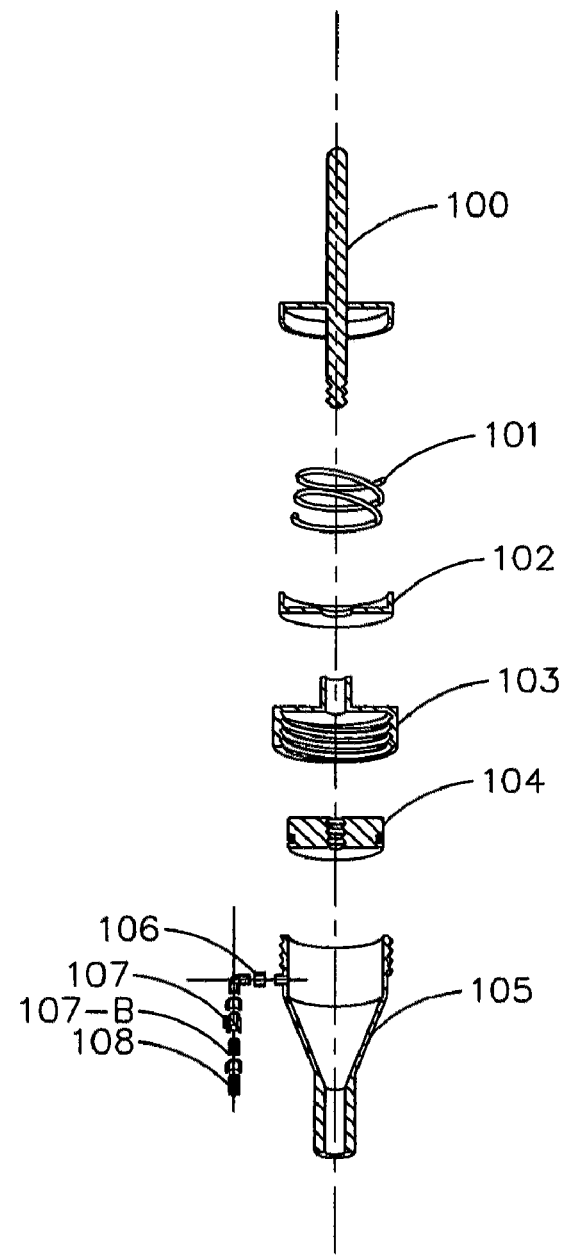

FIG. 19A is a exploded parts section view perspective depiction of FIG. 18A of associated components of Actuator Thrust Rod 100 and associated components Spring 101, Thrust Rod Sleeve 103, Piston 104, Cylinder 105, Snap Connector 106, Ball Check Valve 107, Ball Check Valve 107-B, Ball 107-C, Hydraulic Fluid Line 108.

Figure 20A:
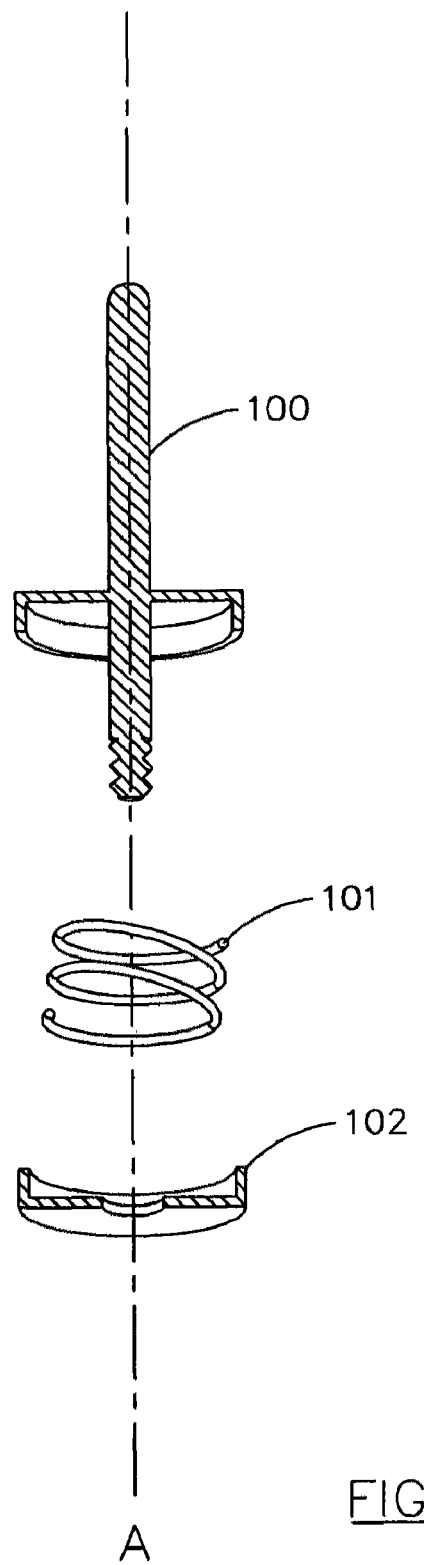

FIG. 20A is a exploded parts section view perspective depiction of FIG. 19A of associated components of Actuator Thrust Rod 100 and associated components Spring 101, Thrust Rod Sleeve 102.

Figure 21A:
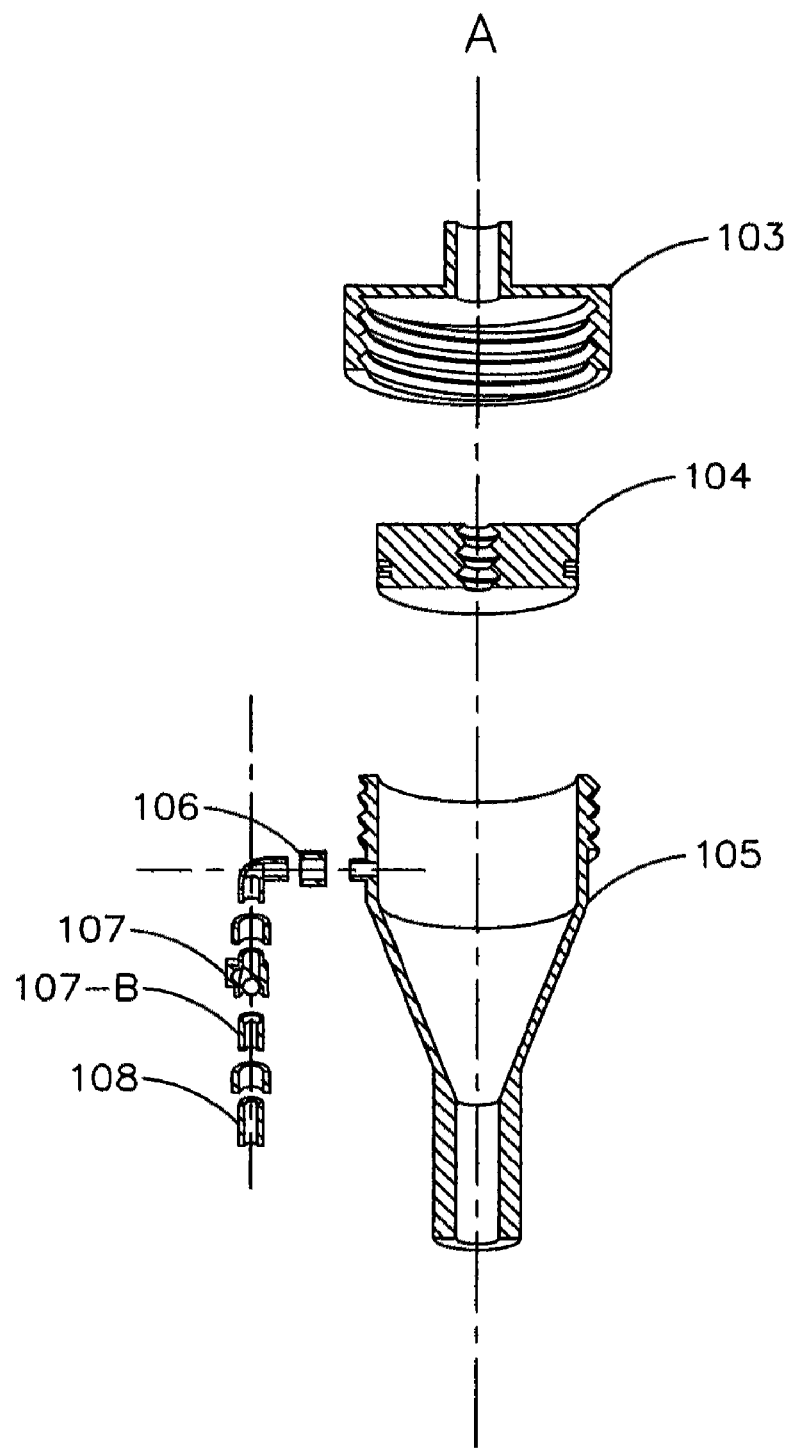

FIG. 21A is a exploded parts section view perspective depiction of FIG. 19A of associated components of Actuator Thrust Rod 100 and associated components Thrust Rod Sleeve 103, Piston 104, Cylinder 105, Snap Connector 106, Ball Check Valve 107, Ball Check Valve 107-B, Ball 107-C, Hydraulic Fluid Line 108.

DETAILED DESCRIPTION OF THE PREFERRED EMBODIMENTS

Referring to the drawings now, wherein like reference numerals refer to like parts throughout the drawing figures, reference number 100 is directed to the vehicular energy recovery system according to the present invention. an actuator bed 100 formed as part of a roadway or trackway.

More particularly, and as shown in, FIGS. 2 and 2A shows a perspective depiction view of FIG. 1 and FIG. 1A a functional schematic diagram schematically represents the components and apparatus of this energy recovery system invention which is comprised of the parts, an upper storage reservoir 10, with a head control gate 20, to provide water having a predetermined head, to a turbine 30, which in the preferred embodiment of this system is a turbine driven generator 50, which produces electrical energy as a result of the water weight and mass which flows through it from head control gate 20. Water exiting the turbine 30 flows through tail water channel 60 which controls and maintains the turbine submergence required value with a weir of determined height, down the spillway 70 to the lower reservoir 80. Water is drained from the lower reservoir 80 through drain pipe 90 which supplies pump 111. Pump 111 is hydraulically actuated by the road bed actuator 100. Pump 111 pumps water past the backflow valve 120 through pipe 130 to the storage reservoir 10 to be recycled.

Figure 15:
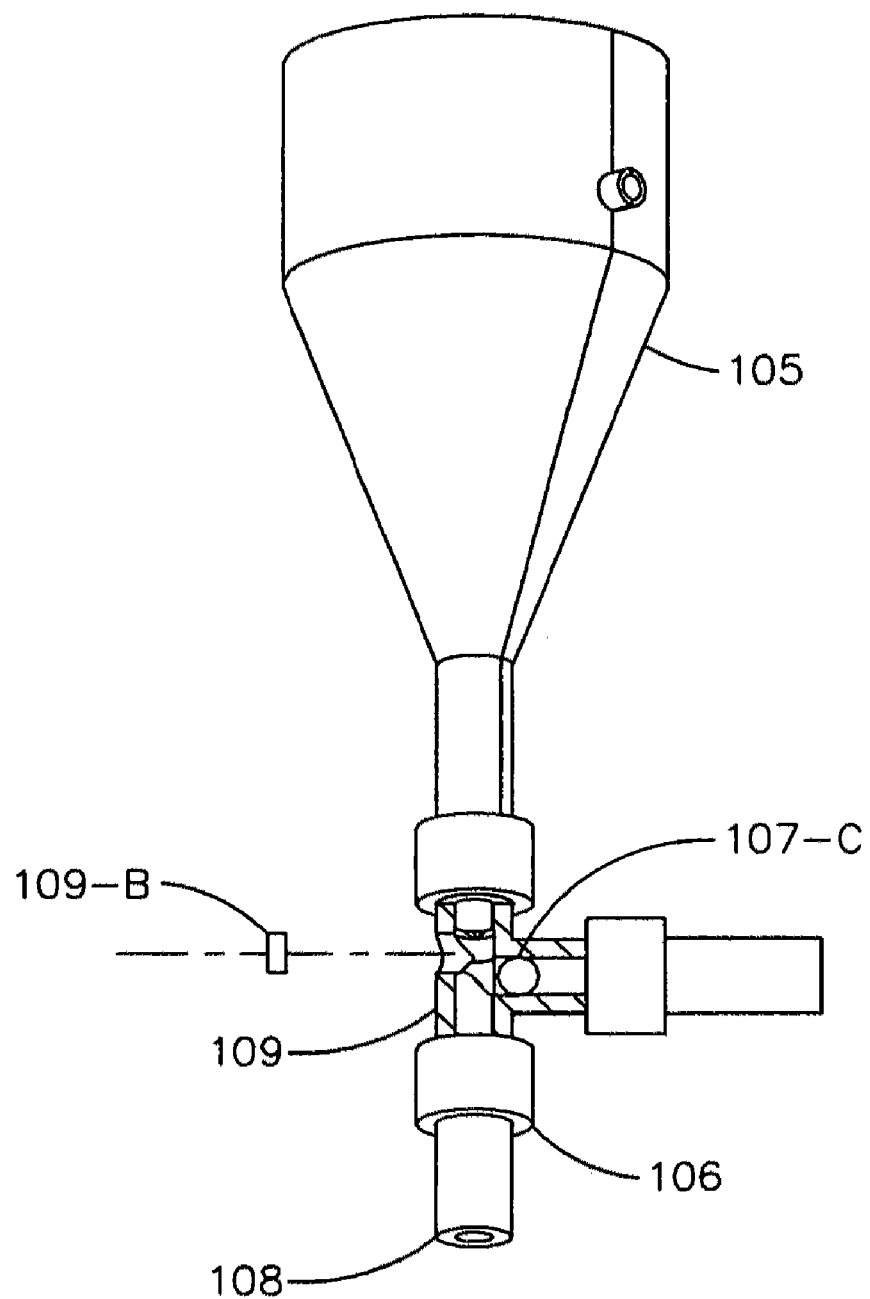
Figure 16A:
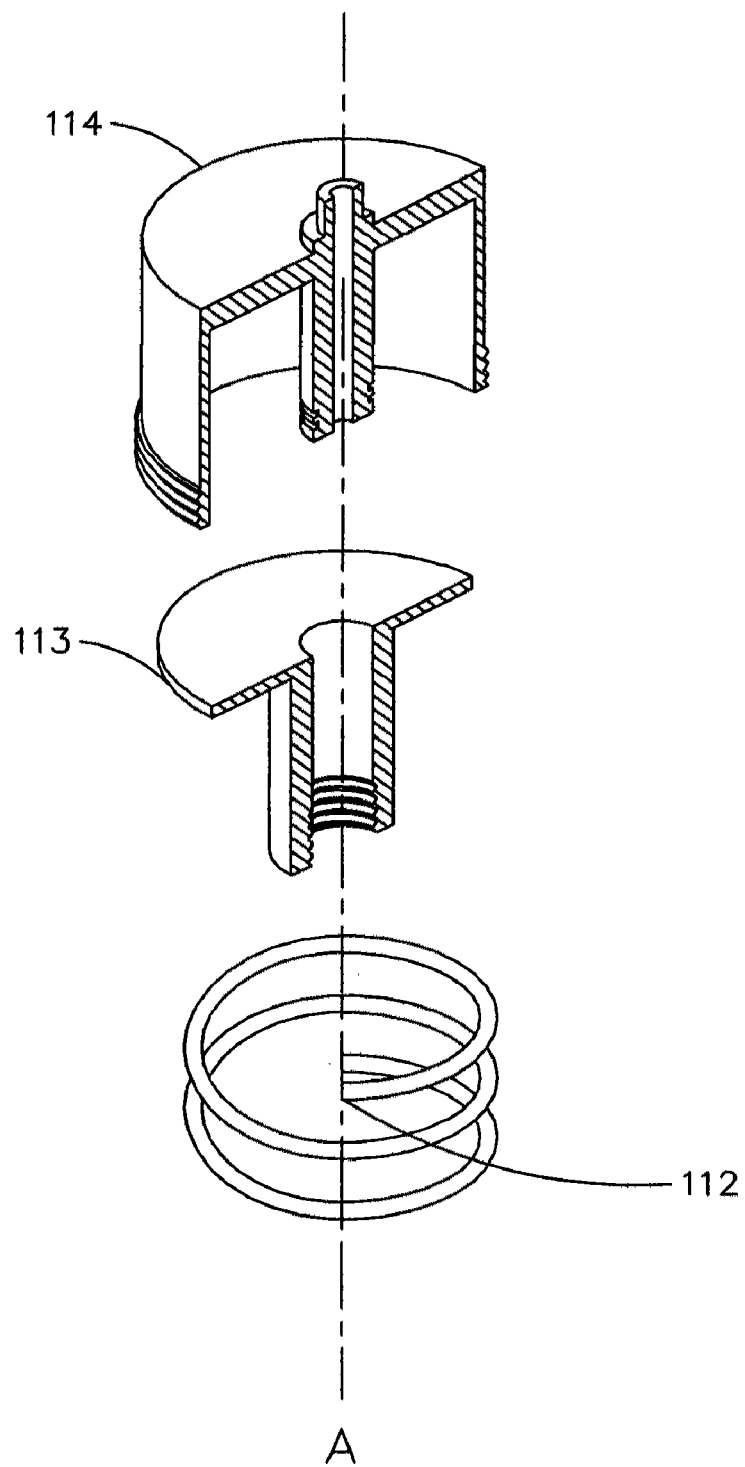
Figure 17A:
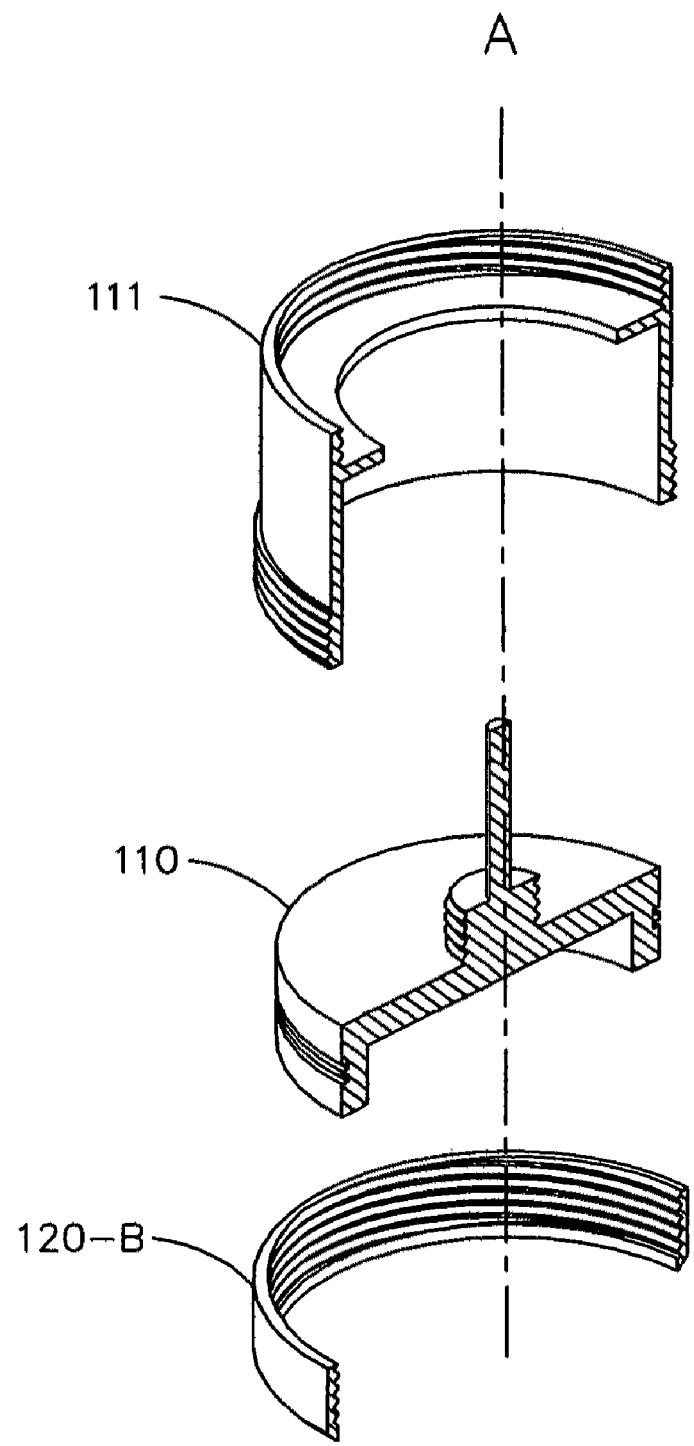

More particularly, FIG. 2 and FIG. 6A shows a perspective depiction view of actuator 100 as a partial cluster of actuators or thrust rods that are disposed in a grating module or in a trackway oriented to extend a determined height above the surface of a road or track adapted to receive vehicular traffic thereon, the thrust rod 100 is fastened to reciprocate in the presence of vehicular traffic and spring biased to return the thrust rod 100 to an original, unstressed position. Each deflection of the thrust rod 100 with an associated piston contained within a hydraulic cylinder causes the fluid contained within to be pulsed in response to pressure formed from the determined deflection. The assemblage shown in FIG. 10 and FIG. 18A defining a single thrust rod 100, a plurality of which may be hooked in series for additional power pulses. The thrust rod 100 is constrained for axial translation in a substantially vertical direction by means of a thrust rod wall/sleeve 103 having a lesser cross section that the somewhat bulbous shape of the thrust rod tip, an area being provided between the tip of the thrust rod and the thrust rod wall/sleeve 103 to accommodate about the wall/sleeve 103 a return spring 101, a recess being provided in a bottom face of the thrust rod tip to constrain the return spring 101 so that negative vertical displacement of the thrust rod 100 will be countered by biasing of the spring 101 urging the thrust rod 100 back in its unstressed state when a vehicle tire or rail wheel for example has passed thereover. The thrust rod wall/sleeve 103 itself is embedded within a grating 102 which allows build up of liquids and the like to be dissipated within the grating and drained off in any conventional manner. A plurality of thrust rods 100 form a matrix or array oriented in a manner to be defined. A lower most terminus of the thrust rod 100 communicating at a lower extremity within the thrust rod wall/sleeve 103 a lower piston 104 integrally formed with the thrust rod 100 is adapted to move reciprocally within a hydraulic cylinder 105, and a tight machined fit exists between the hydraulic cylinder 105 and a lower piston 104. The piston 104 provides a fluidic seal above and below by mean of a plurality of O-rings 104-B circumscribing the piston 104, the O-ring 104-B discouraging the migration of hydraulic fluid upwardly beyond the point. Thus, negative vertical displacement of the thrust rod 100 causes fluid contained within the hydraulic cylinder 105 to provide a power pulse below the hydraulic cylinder 105. FIG. 15 reveals plural passageways coupling 109 through hydraulic cylinder 105 which allows fluid to pass thereto from its surrounding reservoir via check valves in passageway coupling 109. Each of the hydraulic cylinder 105 has means defining an outlet formed as a fluid outlet nipple 105-A at its bottom most face to allow the egress of liquid therebeyond. To this end, a fluidic line 108 extends from the nipple and thence forward to a T-shaped coupling 109, a plurality of couplings optimally associated with each of the plural fluidic lines. In a preferred form, the T-shape coupling 109 allows at least two actuator thrust rods 100 to be harnessed to a single fluidic line 108 downstream from the T-shape coupling 109, and an integrally formed check ball 107-C is provided so that a fluidic pulse from one of the two fluidic lines 108 displaces the check ball 107-C from a first to a second position to allow fluid pressure to translate therebeyond. The check ball 107-C remains in that one position since at a later moment in time the fluid will pass back up the single fluidic line 108 by virtue of the access afforded by the check ball 107-C. Thus, a plurality of thrust rods 100 spaced a sufficient distance can be serviced by a single fluidic line 108 downstream from the T-coupling 109 so long as a tire or train wheel encountering the thrust rods 100 does not operate the two thrust rods 100 serviced by the single fluidic line 108 at any one time. This effectively reduces by one-half the number of single fluidic lines 108 required downstream from the T-shaped couplings 109 and it should be apparent that numerous such coupling could be incorporated so long as the thusly related thrust rods 100 are not simultaneously actuated. Therefore thrust rods 100 accommodated by the same coupling 109 are spaced by an intervening number N, in a preferred form the number being 6.

Downstream from the T-shape coupling 109, the single fluidic line 108 is adapted to communicate with a piston 110 having a hydraulic cylinder 114 exhibiting a reduced cross section when compared with the fluid forced from the hydraulic cylinder 105. Thus, the piston 110 defines a reduced cylinder 114 which causes displacement of the piston 110 when the fluid pressure is present.

Figures 6, 7:
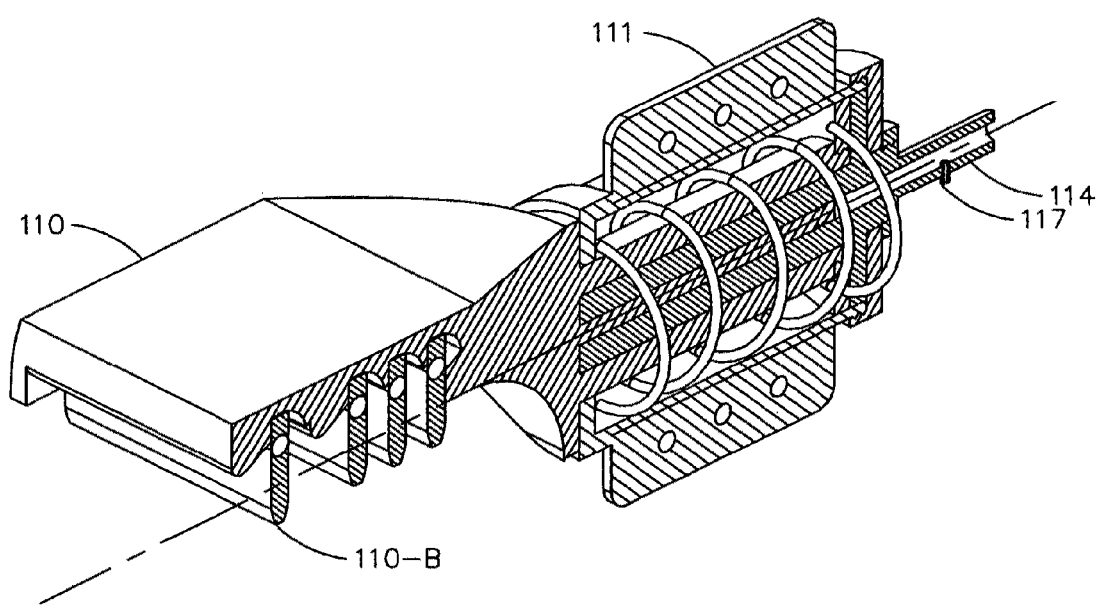
FIG. 6 is a section view perspective depiction of FIGS. 3 and 4 view of Pump 110 and associated components Thrust Pawl Ratchet 110-B, Spring 112 Cylinder Housing 111, Spring 112, Piston 110 Cylinder 114 with Hydraulic Bleed Valve 117.
FIG. 7 is a exploded parts section view in perspective depiction of FIG. 6 of Pump 110 and associated components Thrust Pawl Ratchet 110-B, Spring 112 Cylinder Housing 111, Spring 112, Piston 110 Cylinder 114 with Hydraulic Bleed Valve 117.

More particularly, FIG. 6 shows a perspective depiction view of the piston 110 and an associated cylinder 111, and reduced cylinder 114, respectively define an interfacing single fluidic line 108 means that allows communication of piston 104, described above with piston 110 to be described shortly hereafter. In one form of the invention, (the roadway application), the cylinders 111 and 114 have the following configuration: the cylinder 114 has a lesser cross sectional area than when compared with the cylinder 111, and accordingly, the piston 110 has two working ends making the piston double acting, Connecting the distal faces of the piston 110 is an annular cylinder 111 concentric to reduced cylinder 114. Moreover, one end of the reduced cylinder 114 interfacing the hydraulic single fluidic line which communicates with the piston 110 includes a cylinder 114 dimensioned to fit within the stem piston 110-A constrained by the thus formed guide 114. The enlarged face of the cylinder 114 in relation to both the annular cylinder 114 and the cylinder 111 provides an elongate annular space for the reception therein of a biasing means, as shown in the drawing a spiral spring 112 constrained to operate within the cylinder 111 and surrounding the cylinder 114 so that in use in operation the following will occur: depression of the thrust rod 100 will provide (assuming a non-compressible fluid within the cylinder and the system has been adequately bled for the removal of all vapor), a concomitant pulse within the piston/cylinder arrangement 110, 114 immediately described hereinabove, operating against spring tensioning to return to its original unstressed state. Each fluid pulse is allowed to communicate through a single fluidic line to piston and cylinder arrangement 110, 114 having a reduced cross section for a pulse of greater intensity and deflection. The piston and cylinder arrangement 110, 114 is spring biased to return to an original, unstressed position simultaneously with thrust rod 100. The fluidic pressure when encountering the piston 110 will provide a force thereagainst causing displacement of the piston 110 so that it extends within the cylinder 114. The removal of pressure of the thrust rod 100 allows for the spring 112 in cooperation with the spring 101 to be reinitialized. The single fluidic line 108 thereby reciprocates in a path between the first and second positions in response to receiving energy in the form of pressure from the thrust rod 100. The piston 110 and cylinder 114 defines an interfacing area in which pulses from piston 104 are reflected and amplified and sent to piston 110 as follows: The piston and cylinder arrangement 110,114 is provided with double sided piston surfaces with one surface remote from the single fluidic line 108. The remote surface is fastened to reciprocate simultaneously the piston 104 pulsed in response to pressure formed from the determined deflection of the thrust rod 100 in the presence of vehicular traffic. The piston 110's remote surface is a thrust pawl ratchet 110-B with retractile teeth which fold-back during 110's return the original unstressed position. FIGS. 3, 4, 5 and 6 shows the thrust pawl ratchet 110-B operates or drives the thrust pawl ratchet 110-B over a ratchet wheel 118 connected to an off-centered barrel pump 118-B with oscillatory blades 119 for rotation. The oscillatory blades 119 are controlled with wheels 119-B within enclosed guide tracks within the pump casing 111-B, C and D causing oscillation of the blades in and out of the off-centered barrel within the casing. The barrel pump 118-B with oscillatory blades 119 of 118-B pumps water from drain 90 line past a backflow valve 120 into return/supply line 130 into the upper storage reservoir 10 to be recycled by the system.

More particularly, FIG. 14A shows a perspective depiction view of the reduced piston 110 and an associated first, second and third cylinder 111, 113, 114, respectively define an interfacing single fluidic line 108 means that allows communication of piston 104, described above with piston 110 to be described shortly hereafter. In another form of the invention, (the trackway application), the piston 110 and cylinder 114 have the following configuration: the first cylinder 114 has a lesser cross sectional area than when compared with the second cylinder 111, and accordingly, the piston 110 has two working ends making the piston double acting, each end of the piston having a face 110-A, 110-B of dimension corresponding to the inner diameter of the inner surface area of each respective cylinder within which it reciprocates. Connecting the distal faces of the piston 110 is an annular cylinder concentric to reduced cylinder 114 and disposed therewithin, and a central core 113 concentric within the annular cylinder 114. Moreover, one end of the reduced cylinder 114 the hydraulic single fluidic line 108 which communicates with the piston 110 includes a cylinder 114 dimensioned to fit within the stem piston 110-A constrained by the thus formed guide 114. The enlarged face 113-A of the cylinder 113 in relation to both the annular cylinder 114 and the cylinder 111 provides an elongate annular space for the reception therein of a biasing means, as shown in the drawing a spiral spring 112 constrained to operate within the cylinder 114 and surrounding the cylinder 113 so that in use in operation the following will occur: depression of the thrust rod 100 will provide (assuming a non-compressible fluid within the cylinder and the system has been adequately bled for the removal of all vapor), a concomitant pulse within the piston/cylinder arrangement 110, 114 immediately described hereinabove, operating against spring tensioning to return to its original unstressed state. Each fluid pulse is allowed to communicate through a single fluidic line 108 to a piston 110 and cylinder 114 arrangement having a reduced cross section for a pulse of greater intensity and deflection. The piston and cylinder arrangement 110, 114 is spring biased to return to an original, unstressed position simultaneously with thrust rod 100. The fluidic pressure when encountering the central stem 110-A of the piston 110 will provide a force thereagainst causing displacement of the piston 110 so that it extends within the cylinder 111 which in turn contains a fluid from reservoir 80 and defines the initialization point of the fluid. The removal of pressure of the thrust rod 100 allows for the spring 112 in cooperation with the spring 101 to be reinitialized. A single fluidic line 108 reciprocates in a path between piston 104 and piston 110 in response to receiving energy in the form of pressure on the thrust rod 100. The piston 110 and cylinder 114 defines an interfacing area in which pulses in the piston 104 are reflected and amplified and sent to piston 112 as follows: The piston and cylinder arrangement 110, 114 is provided with double sided piston surfaces with one surface remote from the a single fluidic line 108. The remote surface is fastened to reciprocate simultaneously the piston 104 pulse in response to pressure formed from the determined deflection of the thrust rod 100 in the presence of vehicular traffic. As shown in FIG. 9A and FIG. 10A, each of the cylinders 111 are arranged to communicate within a manifold 120 extending transverse to the axis of symmetry of the cylinder 111. The manifold 120 in turn has first and second ends provided with appropriate valving so that unidirectional flow of the fluid can occur, each end of the manifold is equipped with ball check valves provided with appropriate seals, and includes a housing for check ball 125 constrained by means of a central axial pin to translate in a strictly linear path, the axle 124 supporting a biasing spring 122 to keep the ball valve 125 biased in one direction until the ball is displaced under fluidic pressure from the manifold. Thus, first and second axle walls 121, 126 support the spindle 124 and the walls are foraminous to allow fluidic passage there beyond. The manifold downstream of the check valve 125 communicates with a fluid conduit 120/130 oriented to feed a turbine in one form of the invention. As shown in FIG. 4A for example, the fluidic conduit 120/130 allows communication with a turbine 30 having a generator 50 operatively conditioned thereby. Tailwater from the turbine is returned to a fluid reservoir 80 through fluid return lines 60 and 70.

Whereas FIG. 2 reflects a plurality of FIG. 10 thrust rods 100 disposed in an array or matrix oriented in such a fashion to accommodate the width of a tire for example and therefore would provide an array having length and width in the road to accommodate the engagement of the tire in any of a plurality of the areas, FIG. 6A reflects an arrangement of FIG. 18A substantially the same as that which is shown in FIG. 2 but oriented to be used in cooperation with a train wheel such that a matrix having length but not the same width as the FIG. 10 embodiment would be required. Note also the return spring 101 has been moved further from the working tip of the thrust rod 100 so that the working head may have reduced dimension and lend the device for rapid a facile installation by retrofitting on existing train tracks from below.

FIG. 4A reflects an illustrative of the system when combined with the benefits of a flywheel/spillway 70 and exhibiting some properties of a gyroscopic effect. More particularly, the FIG. 4A shows a train instrument having the track wheels immediately discussed hereinabove, the associated actuators 100 and manifolds 120 shown in FIGS. 5A, 6A, 7A, and 8A. FIG. 4A shows fluid communication occurs through the manifold 120/130 and communicates with the turbine 30 having a shaft communicating with an appropriate electromagnetic structure such as generator 50. Tailwater 60 is returned to the tailwater reservoir 80 via flywheel/spillway 70 as described hereinabove. The track wheels in turn support a flywheel/spillway 70 arrangement having substantially triangular configuration. Thus, the train wheels and its associated flywheel/spillway 70 rotate about the axis defined by the shaft 20 and the flywheel/spillway 70 serves to render constant a source of power. It is to be noted that while source power P is shown adjacent to the flywheel, this system/device may be operated such that the electromotive apparatus 50 is either driving or being driven. The flywheel and its vanes or blades may also define a rotor, with its housing a stator.

In use and operation, it is contemplated that these devices be installed as modules as shown in FIG. 2A which include an appropriate transportation, and such instrumentalities can be deployed where desired, replaced expeditiously for maintenance as should be evident. By way of illustration, additional reference numerals referring to associated seals, O-rings, washers and the like are included in FIGS. 11 and 19A for example, not by way of limitation but to render evident to one skilled in the art how to fabricate the instrument associated with the instant application based on this disclosure.

More particularly, having thus described the invention, it should be apparent that numerous structural modifications are contemplated as being a part of this invention as set forth hereinabove and as defined herein below by the claims.

The invention claimed is:

1. A system comprising a plurality of thrust rods oriented to extend beyond a surface of a road or track way adapted to receive vehicular traffic thereon; each thrust rod reciprocating in the presence of vehicular traffic and spring biased to return to an original, unstressed position; each reciprocation of an associated thrust rod pulses a fluid contained within an associated first hydraulic cylinder, in response to movement of a first piston associated with the thrust rod; each fluid pulse communicates through a single fluidic line to a first surface of a second piston, associated with second cylinder arrangement, such that the first surface of the second piston has a smaller cross section than that of the first piston; wherein the second piston is spring biased to return to an original, unstressed position simultaneously with the thrust rod and has a remote surface, remote form the single fluidic line which causes fluid to be pumped from a reservoir, through a fluid conduit past a turbine and generator arrangement; and wherein fluid from the turbine flows to the reservoir.

2. The system of claim 1 in which each first cylinder arrangement includes a T-shape coupling with an integrally formed check ball; and wherein the actuator thrust rods are in a matrix array.

3. The system of claim 1, wherein the remote surface interacts with a thrust pawl ratchet with retractable teeth which fold back during the return of the second piston to the original position, the thrust pawl ratchet drives a ratchet wheel connected to an off-centered barrel pump with oscillatory blades, wherein the barrel pump pumps fluid past a backflow valve to the fluid conduit.

4. The system of claim 1, wherein a manifold, extending transverse to an axis of symmetry of the cylinder, has first and second ends provided with appropriate ball check valves with biasing springs so that unidirectional flow of the fluid will occur from the reservoir through the fluid conduit.

5. The system of claim 1, wherein fluid from the turbine flows to the reservoir by a flywheel/spillway, with track wheels supporting the flywheel/spillway.

6. The system of claim 5, wherein the flywheel/spillway includes vanes.

7. The system of claim 1, wherein the plurality of thrust rods, first cylinders, second cylinder arrangements and a part of the reservoir are formed as modules.

* * * * *